(12) United States Patent
Hibi

(10) Patent No.: US 9,354,801 B2
(45) Date of Patent: May 31, 2016

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventor: Makoto Hibi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 14/024,417

(22) Filed: Sep. 11, 2013

(65) Prior Publication Data

US 2014/0082538 A1    Mar. 20, 2014

(30) Foreign Application Priority Data

Sep. 14, 2012 (JP) ................................. 2012-203096

(51) Int. Cl.
 *G06F 3/048* (2013.01)
 *G06F 3/0486* (2013.01)
 *G06F 3/0484* (2013.01)
 *G06F 3/0488* (2013.01)

(52) U.S. Cl.
 CPC .......... *G06F 3/0486* (2013.01); *G06F 3/04845* (2013.01); *G06F 3/04883* (2013.01)

(58) Field of Classification Search
 CPC .................................................. G06F 3/0486
 USPC .................. 345/628; 715/769, 788
 See application file for complete search history.

(56) References Cited

U.S. PATENT DOCUMENTS

| | | | | |
|---|---|---|---|---|
| 5,617,114 A | * | 4/1997 | Bier | ...................... G06F 3/0481 345/634 |
| 6,785,878 B2 | * | 8/2004 | Soper | ........................ G04F 1/36 716/53 |
| 7,333,670 B2 | * | 2/2008 | Sandrew | ............... G06T 7/0036 348/E9.028 |
| 8,587,614 B2 | * | 11/2013 | Stevenson | ............... G06T 11/60 345/619 |
| 2010/0171712 A1 | * | 7/2010 | Cieplinski | ........... G06F 3/04883 345/173 |
| 2011/0163988 A1 | | 7/2011 | Senda | |
| 2012/0262458 A1 | * | 10/2012 | Fowler | .................... G06T 19/00 345/427 |

FOREIGN PATENT DOCUMENTS

JP    2003-323241 A1    11/2003
WO    WO2010/032354 A1    3/2010

* cited by examiner

*Primary Examiner* — Mohamed Abou El Seoud
(74) *Attorney, Agent, or Firm* — Canon U.S.A., Inc. IP Division

(57) ABSTRACT

According to the invention, an image and an object indicating a candidate area, to be processed, in the image are displayed on a display screen. Whether a position designated by a user in the display screen on which the displaying is executed, is outside the object is determined. In a case where it is determined that the position is outside the object, an object moves to an area, in the display screen, corresponding to the position designated by a user. The area to which the object area is moved is decided as a candidate to be processed.

18 Claims, 20 Drawing Sheets

IMAGE PROCESSING APPARATUS, IMAGE PROCESSING METHOD, AND STORAGE MEDIUM STORING PROGRAM

BACKGROUND OF THE INVENTION

1. Field of the Invention

The present invention relates to image processing apparatuses, image processing methods, and programs which decide an area to be processed in an image.

2. Description of the Related Art

Technologies have been known which perform various kinds of image processing on an image such as a document and a photograph displayed on a display screen. For example, there have been known a technology (which may be called trimming or cropping) which designates a partial area in an image as an output target, a technology (which may be called masking) which deletes the partial area, and a technology which changes color and/or brightness of the partial area.

A technology has been known in which a user designates a target area of processing as described above in an image. Japanese Patent Laid-Open No. 2003-323241 discloses that a frame (trimming frame) showing a target area of trimming is displayed on an image. In this case, when a user designates a trimming frame and then performs a drag operation thereon, the trimming frame is moved as if it follows the drag operation.

According to the technology in the related art, after a user designates a trimming frame, the trimming frame moves by following a user's drag operation. Thus, a user may be required to perform a drag operation from a position where a trimming frame is displayed within a display screen to a position desired as a trimming target. When the distance to the desired position is long, the area of the trimming target may not be easily designated in some cases.

For example, in moving a trimming frame by using a pointing device such as a mouse, when a distance to a desired position is long, repeating drag operations may be required to move a trimming frame to the desired position. For example, in moving a trimming frame by a drag operation on a touch panel, when a distance to a desired position is long, a user may unintentionally release his/her finger from a touch panel during the drag operation. In this case, another drag operation may be required to move the trimming frame to the desired position.

SUMMARY OF THE INVENTION

The present invention was made in view of the problems and provides an image processing apparatus, image processing method, and storage medium storing program, with which an area to be processed in an image is readily decided.

There is provided an image processing apparatus including a display control unit for causing a display screen to display an image and an object indicating a candidate area to be processed, a determining unit to determine whether a position designated by a user is outside the object, a moving control unit for moving the object to an area corresponding to the position designated by the user when it is determined that the position is outside the object and a deciding unit for deciding the area to which the object area is moved by the moving control unit, as a candidate to be processed.

Further features of the present invention will become apparent from the following description of exemplary embodiments with reference to the attached drawings.

DESCRIPTION OF THE EMBODIMENTS

An embodiment of the invention will be exemplarily described in detail with reference to drawings. It should be noted that the scope of the invention is not limited only by relative arrangements, display screens and so on according to the embodiment otherwise specifically indicated.

Figure 1:
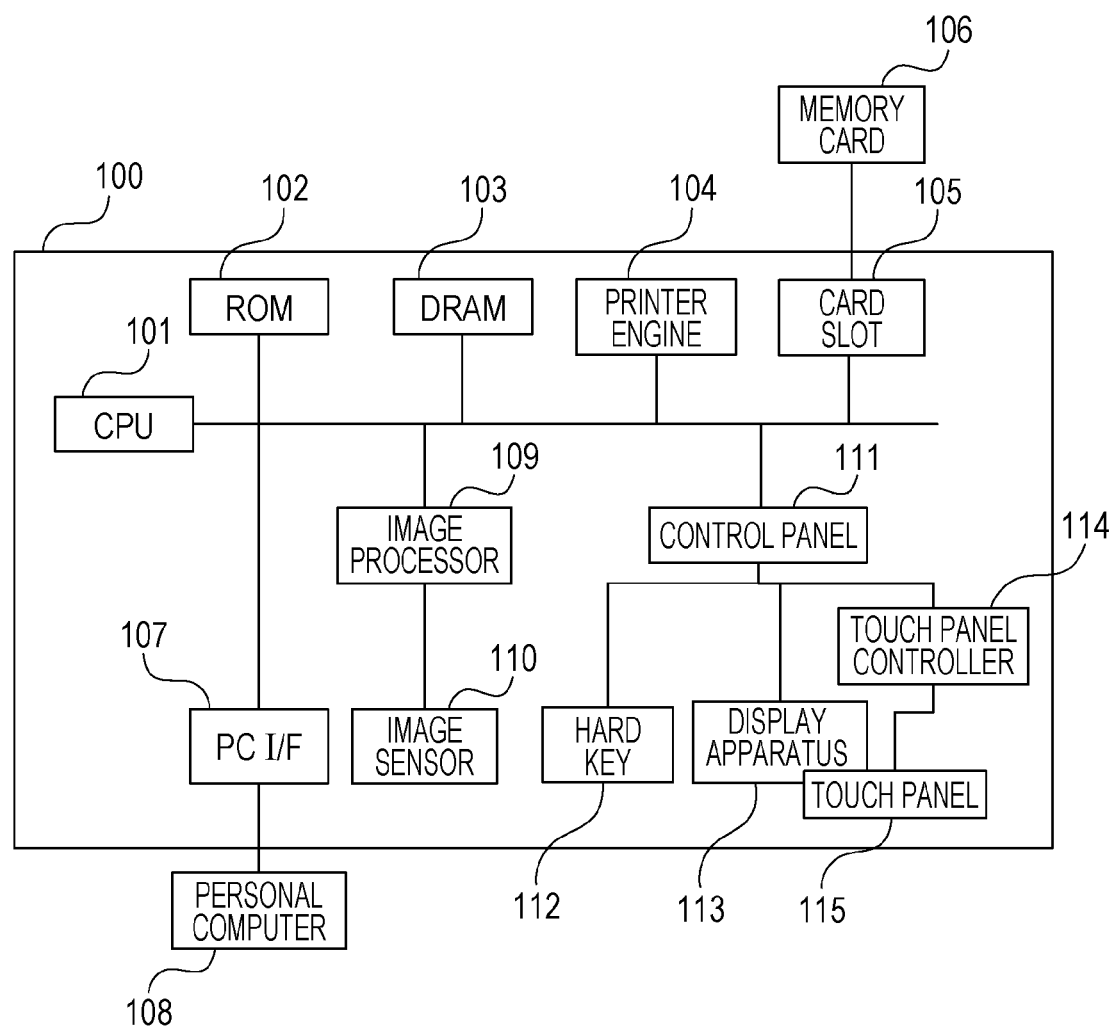
FIG. 1 is a block diagram illustrating an image processing apparatus according to an embodiment.

FIG. 1 is a block diagram illustrating an image processing apparatus according to an embodiment. A multi-function peripheral (hereinafter called an MFP) 100 is an example of an image processing apparatus. The MFP 100 has a scanning function, a printing function, and a card direct function.

A CPU 101 is a system control unit for the MFP 100 and generally controls over the MFP 100. A ROM 102 stores a system control program for the MFP. A DRAM 103 is memory which temporarily stores image data and a control program. The CPU 101 executes on the DRAM 103 a control program stored in the ROM 102 to control an operation relating to the MFP 100. Such a control program for the CPU 101 is not limited to one stored in the ROM 102 but may be one stored in an external storage medium such as a CD-ROM.

A printer engine 104 is a printing unit which prints an input image on recording paper. A PC I/F 107 is an interface which connects the MFP 100 and a personal computer 108. The personal computer 108 is a host computer which may change setting data on the MFP 100 and send the MFP 100 a request for starting an operation through the PC I/F 107. An image sensor 110 is a document reading unit and is a reading sensor for reading a document mounted on a document stand, not illustrated. Through the image sensor 110, an image read from a document is input. An image processor 109 performs image processing on a read image input through the image sensor 110.

A control panel 111 has a power switch, not illustrated, a hard key 112, a display device 113 which displays an operating condition and a state of an apparatus, for example, and a touch panel 115 arranged on the display device 113. When an operator touches the touch panel 115 by using his or her finger or an instrument such as a touch pen, the coordinates of the position touched by a finger or an instrument (the way of plotting will be described below) are detected by a touch panel controller 114. The touch position coordinates detected by the touch panel controller 114 are input to the CPU 101 as a touch event. When a touch event is input to the CPU 101, the CPU 101 may perform processing according to the touch position coordinates and content displayed on the display device 113.

The touch panel controller 114 detects a touch position at predetermined cycles. Thus, the period of time during which a user is touching one touch position may be determined. When a user performs a drag operation, touch positions are serially detected on a path of the drag operation. Therefore, the direction, distance, and speed of the drag operation may be determined. When one same touch position is repeatedly detected, it may be determined that a user is continuously touching the same touch position. When a touch position by a user has been detected and then the touch position is no longer detected, it may be determined that a user's finger or a touch pen is released from a touch panel.

Information on a touch by a user is input from the touch panel controller 114 to the CPU 101. The CPU 101 performs control according to the input information. The CPU 101 may determine details of a touch by a user (such as the direction, distance, speed of a drag operation, touched period of time, and a release from a touch panel). In other words, a touch position detected by the touch panel controller 114 at predetermined cycles is input to the CPU 101, and the CPU 101 may determine details of the touch by a user on the basis of the touch position.

The display device 113 is a display unit which may display a photograph image stored in a memory card 106, which will be described below, and a guidance, for example. The CPU 101 decompresses a photograph image or an image of a guidance representation on the DRAM 103 and outputs the decompressed image to the display device 113 for displaying it.

If the CPU 101 receives input of coordinates of a touch position on a touch panel, which are detected by the touch panel controller 114, the CPU 101 may perform processing according to a display content corresponding to the touch position. Thus, a user may designate an area for desired display content on the touch panel 115 by checking the display content on the display device 113 to designate the processing corresponding to the display content to the MFP 100.

A hard key 112 is a key to be pressed by a user. If the hard key 121 is pressed, the CPU 101 performs the processing corresponding to the pressed key.

A card slot 105 is an interface for connecting the memory card 106 to the apparatus. With the memory card 106 connected, the CPU 101 selects a display target from images stored in the memory card 106 in accordance with an operation on the touch panel 115 and/or hard key 121 by a user. The CPU 101 performs display control for displaying the selected image on the display device 113.

The CPU 101 selects an image stored in the memory card 106 as a printing target in accordance with a user's instruction. In a case where an image of the printing target is selected, the CPU 101 reads the image from the memory card 106 and decompresses it on the DRAM 103. The CPU 101 then adjusts print settings for the image decompressed on the DRAM 103 and outputs it to the printer engine 104 for printing the image.

All images stored in the memory card 106 may be scanned to the DRAM 103, and the images may be displayed on the display device 113. An image selected by a user from images displayed on the display device 113 may be printed by the printer engine 104. According to this embodiment, an image in a JPEG file that is one kind of image file may be decompressed for displaying or printing it. A JPEG file may store two images having a same content but having different the number of pixels. An image (thumbnail image) having fewer the number of pixels may be used for display, and an image having more the number of pixels may be used for printing.

Figure 2A:
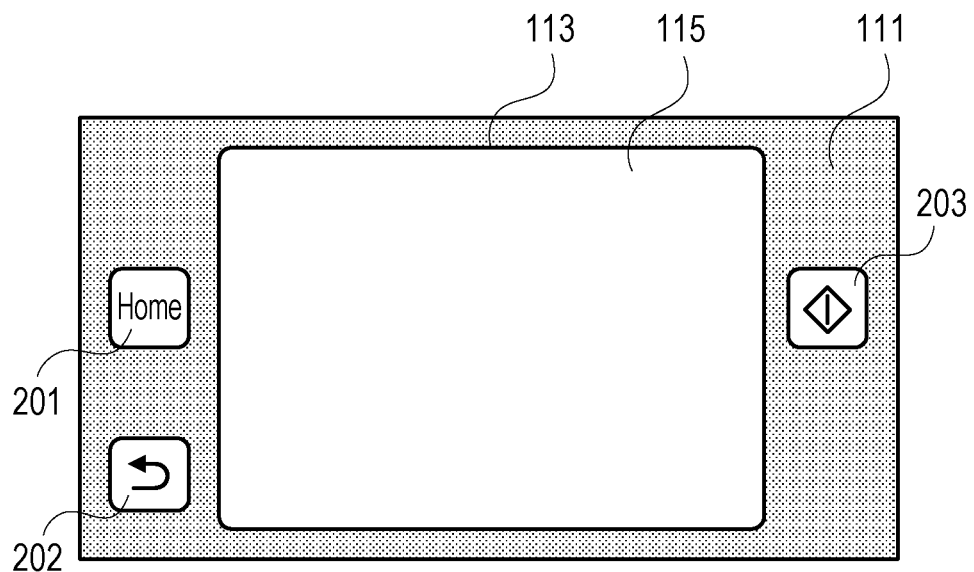
FIGS. 2A and 2B illustrate a display device and a touch panel.
Figure 2B:
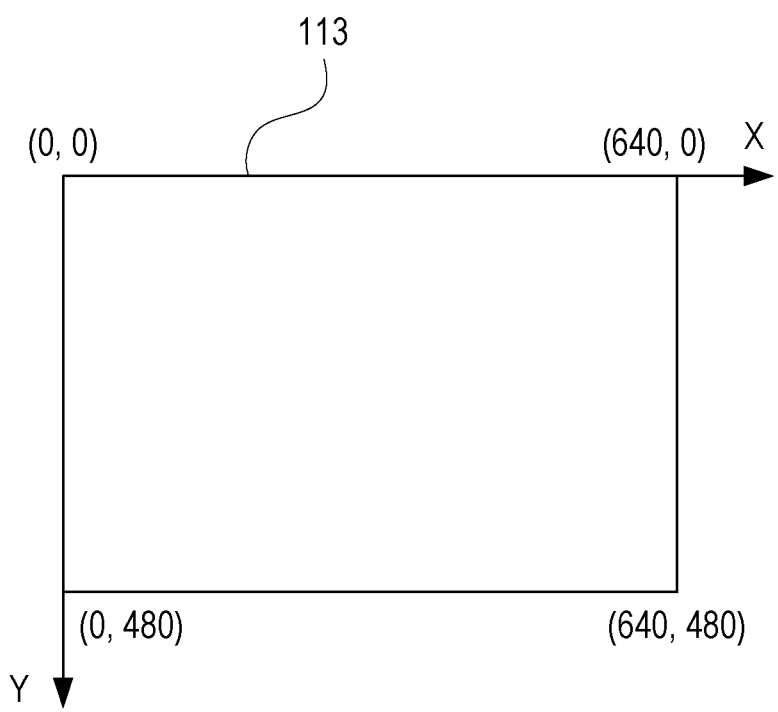

Next, an operation method will be described in detail below in which a user operates the touch panel 115 to select/view an image from images saved in the memory card 106. FIGS. 2A and 2B illustrate the display device 113 and touch panel 115. FIG. 2A illustrates an example of an external configuration of the control panel 111 according to this embodiment. In FIG. 2A, the touch panel 115 is provided over the display device 113, as described above. The CPU 101 causes the display device 113 to display an operation screen including an appropriate icon and/or soft key according to the system state. If the touch panel controller 114 detects that the touch panel 115 has been touched, information (such as a touch position thereof) describing details of touch is provided to the CPU 101.

FIG. 2B illustrates coordinates on the touch panel 115. On the touch panel 115, a two-dimensional XY coordinate plane is defined which has its origin at an upper left point of the touch panel 115. The touch position by a user on the touch panel 115 is detected as coordinates on the coordinate plane.

According to this embodiment, the display device 113 includes 640 pixels in an X direction and 480 pixels in a Y direction, and the touch panel 115 has a resolution of 640 in the X direction and a resolution of 480 in the Y direction to fit to the display 113. For convenience of description, a case determined that the coordinates of a touch position detected on the touch panel 115 agree with the display position of a soft key displayed on the display device 113 will be expressed below as the case where "the soft key has been touched".

Each of keys 201 to 203 is configured as the hard key 112 and has a specific function as will be described below. A home key 201 may be used for shifting to a home screen that is the origin of all functions. On the home screen, functions are classified into several categories and displayed using icons not illustrated. A user may select a function by touching one of the icons. A return key 202 is a key for shifting to one previous screen. A screen shift starting from the home screen is saved in a history. Pressing the return key 202 causes a shift to one previous screen by retracing the history. Therefore, the return key is invalid on the home screen that is the origin of all functions. A start key 203 may be used for starting a document image reading operation by the image sensor 110 or a printing operation by the printer engine 104.

According to this embodiment, if the CPU 101 detects that the memory card 106 is connected to the card slot 105, the CPU 101 analyzes digital data saved within the memory card 106. The CPU 101 identifies a JPEG file whose identifier is ".jpg" (upper/lower case insensitive) among digital data therein. An image list is generated which contains numbers corresponding to JPEG files and path information for accessing the corresponding JPEG files within the memory card 106. The image list is generated in the order according to attributes of images. For example, captured times of images stored in the JPEG file are acquired, and an image list is generated such that the images may be included in the order of their captured times on the image list. The CPU 101 automatically displays an image at the top of the list on the display device 113 after the image list is generated.

Figure 3:
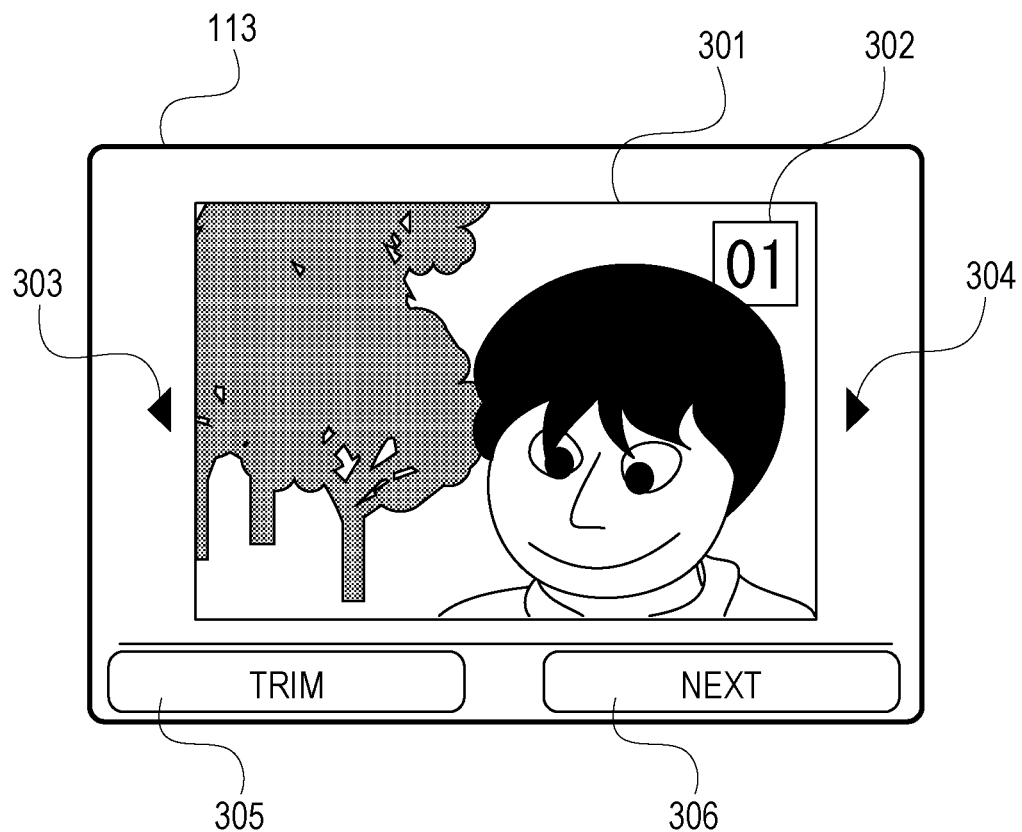
FIG. 3 illustrates an example of image display by the display.

FIG. 3 illustrates an example of an image display on the display device 113. In FIG. 3, an image at the top of the image list is displayed. On the display image illustrated in FIG. 3, a user may set the numbers of prints for a desired image by viewing the image saved within the memory card 106.

A user may touch a soft key 303 or 304 placed at right and left parts of an image being displayed so that an image to be displayed on the display device 113 may be changed. The display target may be changed in the order according to the image list.

For example, in a case where the forward key 304 on a right side of an image on the image list is touched, the CPU 101 causes an image having one higher number than that of an image being displayed in the image list to be displayed. In a case where the reverse soft key 303 placed on a left side of the image is touched, the CPU 101 causes an image having one lower number than that of the image being displayed in the image list to be displayed. In a case where a soft key 302 for inputting the number of prints is touched, the CPU 101 determines the image to be displayed as a printing target and causes the display device 113 to display a number-of-prints setting screen, not illustrated.

In a case where a soft key 306 is touched, a next screen is displayed. The "next screen" here may refer to a screen for selecting output processing (print, zoom-up display, store to memory, transmit to an external device, etc.), for example. When output processing is determined as print, for example, a print setting screen for designating print settings by a user may be displayed.

According to this embodiment, in a case where a soft key 305 displayed on a screen of the display device 113 is touched, the CPU 101 shifts to a trimming mode to perform display control which causes a trimming frame to be displayed. The trimming frame indicates an area of a trimming target on an image being displayed.

Figure 4A:
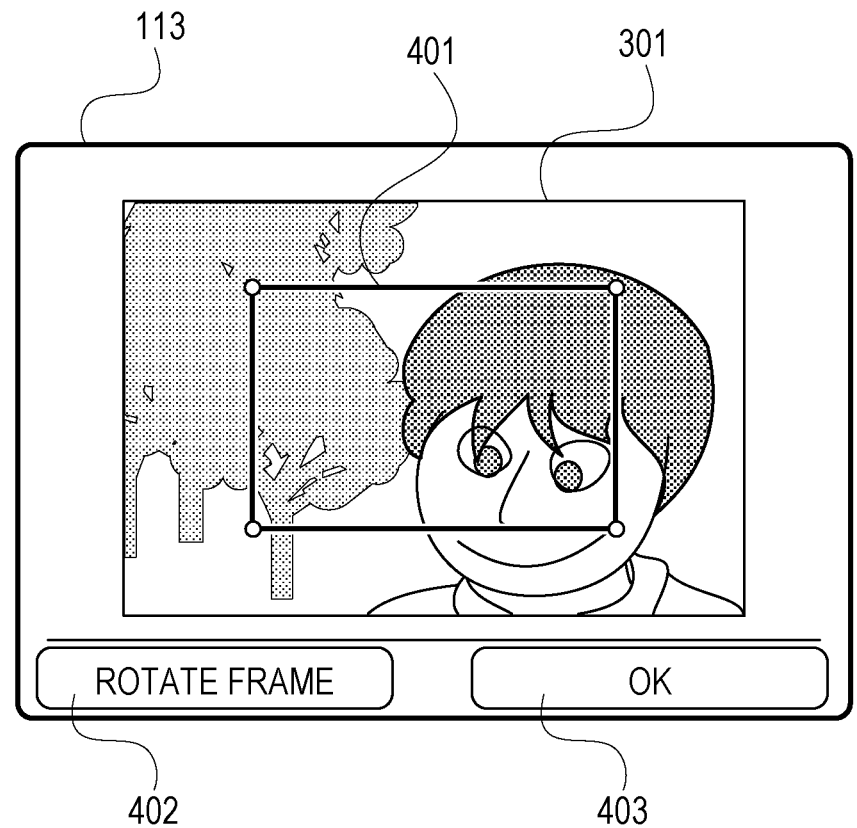
FIGS. 4A and 4B are diagrams for explaining a trimming frame according to the embodiment.
Figure 4B:
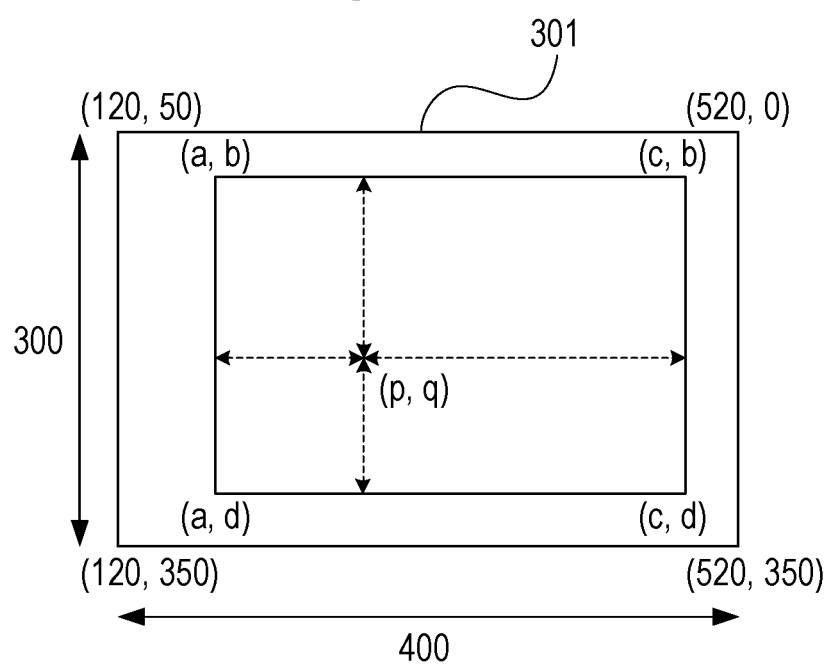

FIGS. 4A and 4B are diagrams for explaining a trimming frame according to this embodiment. As illustrated in FIGS. 4A and 4B, a trimming frame is displayed in the trimming mode. The expression "trimming" here refers to processing of determining a part of an image as a target of output processing such as display, print, and transmit. According to this embodiment, an internal part of a trimming frame on an image is a candidate of a target of output processing. A user may perform a touch operation on the touch panel 115 to instruct movement of a trimming frame or trimming of the trimming frame.

In the trimming frame display mode illustrated in FIGS. 4A and 4B, in a case where the size and position of a trimming frame have been designated for an image being displayed, the size/position of the trimming frame is stored. A trimming frame having the designated size is displayed at the designated position. On the other hand, in a case where a trimming frame has not been designated yet for an image being displayed, the trimming frame based on a predetermined size/position is displayed.

When a trimmed image is to be printed, the form of a trimming frame may be set in accordance with the form of a printing medium on which an image is to be printed. Particularly, for example, the aspect ratio of a trimming frame may be set in accordance with the aspect ratio of a rectangular print sheet. When a user designates a print sheet, a trimming frame may be set in accordance with the aspect ratio of the print sheet so as to trim an image having a form matched with the form of the print sheet. For printing an image without a margin on a print sheet (frameless printing), the aspect ratio of a trimming frame is required to be substantially equal to the aspect ratio of the print sheet so as to correctly execute frameless printing. The form of a printing medium is not limited to be rectangular but may be circular, for example. For example, in a case where a user desires printing on a disk medium such as a CD, a circular trimming frame may be displayed to trim a circular area. Thus, trimming according to the form of the disk medium may be implemented.

Trimming will be described as an example of processing to be performed on an image according to this embodiment. A rectangular trimming frame will be described as an example of an object representative of an area to be trimmed. The processing according to this embodiment is not limited to these examples, and image processing may be any processing such as color correction and brightness change. The trimming frame may have various forms such as a rectangular form, a circular form, and an elliptical form. A various object representative of an area may be displayed, not limiting to a frame.

According to this embodiment, when a trimming frame is displayed, an internal part, side, or corner of the trimming frame may be touched to change the size and position of the trimming frame by a drag operation. More specifically, an internal part or a side of an area defined by a trimming frame may be dragged to move the trimming frame. One of four corners of a trimming frame may be dragged to change the size of the trimming frame.

According to this embodiment, a user may touch a position in an external area to a trimming frame on an image displayed on a display screen to move the trimming frame to the position. Thus, a trimming frame may be moved quickly to a desired position without a drag operation by a user. Therefore, a trimming area may be decided easily.

According to this embodiment, a trimming frame is controlled so as to be positioned within an image area 301. The image area 301 may be an area corresponding to an image displayed on a coordinate system of the touch panel 115 of the display device 113. According to this embodiment, the image area 301 in the trimming mode is a rectangular area having an upper left corner at (120, 50) and a lower right corner at (520, 350) as illustrated in FIG. 4B. In order to define a rectangular area on an XY coordinate system, its four points must be clarified. Substantially, the coordinates of two points that are upper left and lower right points may be decided to define the coordinates of the remaining two points.

Processing of setting an area of a trimming target will be described below. In a case where the soft key 305 is pressed on the screen illustrated in FIG. 3 to instruct trimming, a trimming mode starts. As illustrated in FIG. 4A, a trimming frame 401 is displayed in and over the image area 301 in the trimming mode. In a case where the upper left/lower right coordinates of the trimming frame 401 have been designated already, the trimming frame 401 is displayed in accordance with the size/position based on the values of the coordinates. In a case where upper left/lower right coordinates of a trimming frame have not been designated, the trimming frame having a predetermined size is displayed at a predetermined position. The (a, b) and (c, d) in FIG. 4B are upper left/lower right coordinates, respectively. The screen illustrated in FIG. 4A further displays a soft key 402 for rotating a trimming frame and a soft key 403 for exiting the trimming mode and returning to the original screen illustrated in FIG. 3.

Figure 5:
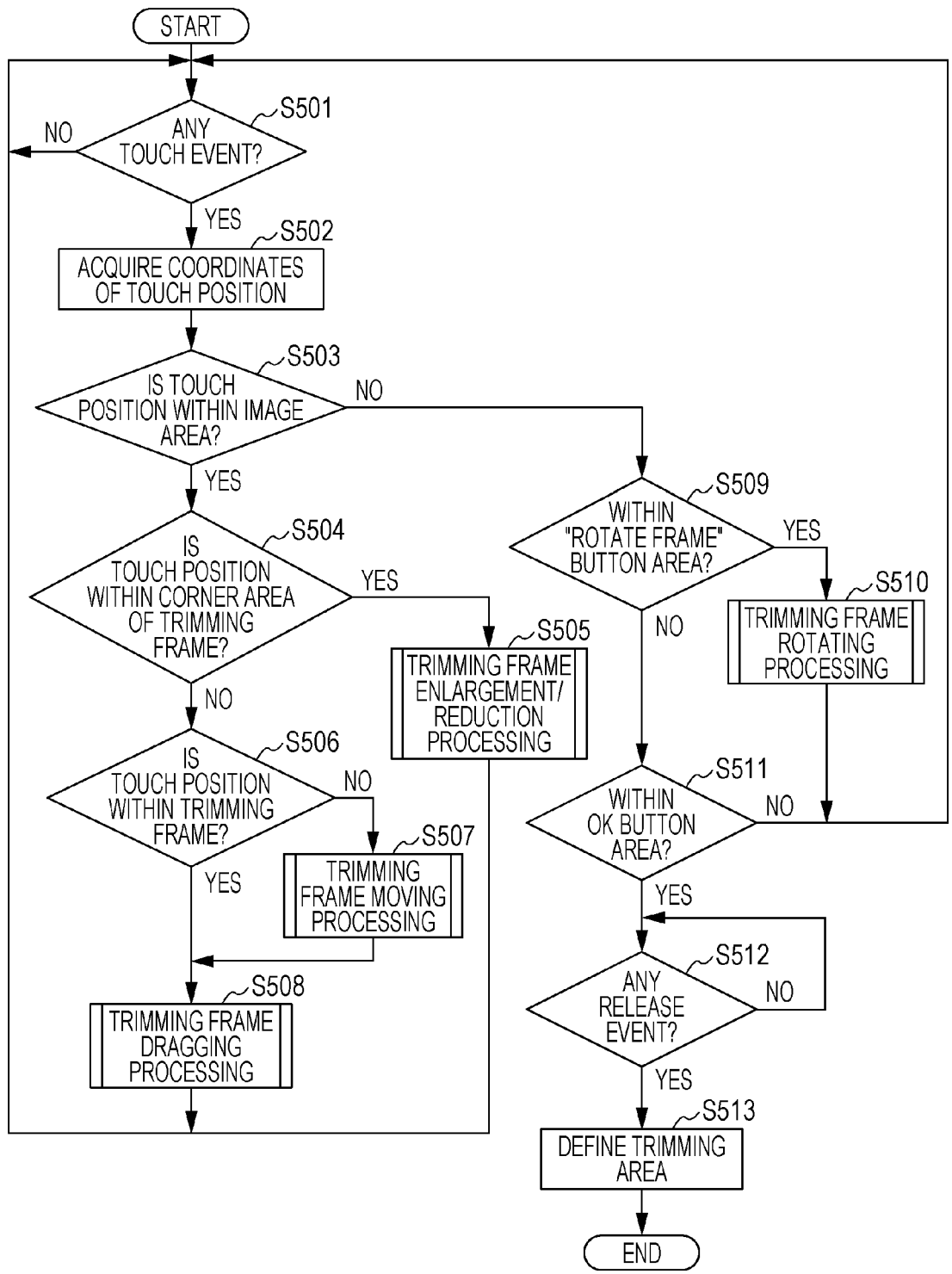
FIG. 5 is a flowchart illustrating setting processing on a trimming area according to the embodiment.

Next, processing of setting a trimming area will be described with reference to the flowchart in FIG. 5. The processing illustrated in FIG. 5 is started when the screen in FIG. 4A is displayed after the trimming mode starts. A control program corresponding to the flowchart illustrated in FIG. 5 is stored in the ROM 102, and the CPU 101 executes the control program on the DRAM 103 to implement the processing illustrated in FIG. 5.

A standby state for a touch event is activated. The touch event is caused by a user with a touch on the touch panel 115 (S501). In a case where the touch panel controller 114 detects a touch, a touch event occurs. In a case where a touch event occurs, the processing moves to S502. The CPU 101 acquires coordinates of a touch position detected by the touch panel controller 114. Next in S503, whether the touch position coordinates are within an image area is determined.

In a case where it is determined that the touch position is within the image area (YES in S503), whether a corner of the trimming frame has been touched is determined next in S504. Since the point at a corner of the trimming frame has theoretically one pixel and in a case where the system assumes that a touch operation is performed with a finger in the system, it is significantly difficult to touch the one point accurately. Accordingly, some permissible values may desirably be considered for corners. For example, when upper left coordinates of a trimming frame are (a, b), permissible values of 5 pixels may be provided inside a rectangle. When a touch occurs within an area represented by a rectangle with an upper left coordinates (a, b) and lower right coordinates (a+5, b+5), it is regarded as "corner has been touched". In a case where the touch panel controller 114 is capable of detecting an area with coordinates touched by a user, whether the corner of the trimming frame is included in the area may be determined. For example, in a case where an area touched by a user is detected as a rectangular area, whether the rectangular area includes the corner is determined.

In S504, in a case where it is determined that a corner of the trimming frame has been touched (YES in S504), the processing moves to S505 where enlargement/reduction processing is performed on the trimming frame. On the other hand, in a case where it is determined that it is not a corner of the trimming frame that the user has touched (NO in S504), the processing moves to S506 where a touch position by a user is within the trimming frame is determined. Here, it is assumed that the touch point on the trimming frame itself is within the trimming frame.

In S506, in a case where it is determined that a touch position by a user is within the trimming frame (YES in S506), the processing moves to S508 where processing of controlling movement of a trimming frame in accordance with a drag instruction by a user is performed. In a case where it is determined that the touch position is outside the trimming frame (NO in S506), the processing moves to S507 where processing of moving the trimming frame is performed. In a case where a release event does not occur after that, the processing moves to S508 where the trimming frame may continuously be dragged. In S508, in a case where a release from the touch panel by a user is detected, the processing returns to S501.

By the processing in S507 and S508, the CPU 101 allows a user to perform a drag operation for moving a trimming frame in a case where the user has touched a position within the trimming frame. In a case where the user has touched a position outside the trimming frame, the CPU 101 performs moving control for moving the trimming frame to the position. In a case where the trimming frame is moved in S507, it is allowed to drag the trimming frame continuously to the movement. Details of the processing in S507 and S508 will be described below.

In a case where it is determined in S503 that the position coordinates acquired in S502 are outside the image area, the processing moves to S509 where whether a "rotate frame" soft key has been touched is determined. In a case where it is determined that the "rotate frame" soft key has been touched (YES in S509), processing of rotating the trimming frame is performed. On the other hand, in a case where it is determined that the "rotate frame" soft key has not been touched (NO in S509), whether an "OK" soft key has been touched is determined in S511. In a case where it is determined that the "OK" button has not been touched (NO in S511), it is not regarded as a valid touch operation on the screen. Thus, the processing returns to the original touch-event standby state. In a case where a touch to the "OK" button is determined, whether a user has released from the touch panel and a release event has occurred is determined in S512. In a case where a release event has occurred, the processing moves to S513. In S513, an area corresponding to the trimming frame on an image being displayed is set as an area of a trimming target, and the trimming mode exits. The original screen illustrated in FIG. 3 is displayed again. When the screen in FIG. 3 is displayed again, the trimming area set in S513 in an image being displayed may be displayed.

Next, the trimming frame drag processing in S508 in FIG. 5 will be described with reference to FIGS. 6 and 7.

Figure 6:
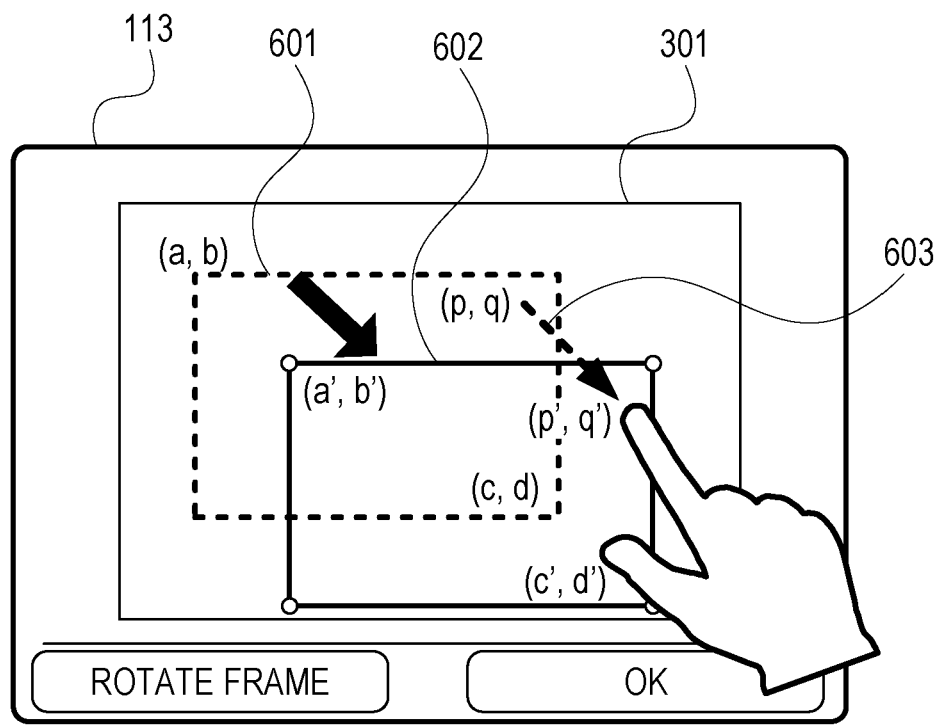
FIG. 6 is a diagram for explaining a movement of a trimming frame by a drag operation.

FIG. 6 is a diagram for explaining a movement of a trimming frame by a drag operation. More specifically, FIG. 6 illustrates that an internal part of a trimming frame 401 is touched and is dragged directly. The broken arrow 603 indicates a path of the drag operation showing that a user has moved his/her finger by keeping the touch state from coordinates (p, q) to coordinates (p', q'). A broken rectangle 601 indicates a trimming frame when the movement starts, and a solid rectangle 602 indicates a trimming frame after moved by following a drag operation. With the movement, the upper left coordinates (a, b) and lower right coordinates (c, d) of the trimming frame before the movement are moved to (a', b') and (c', d'), respectively.

Figure 7:
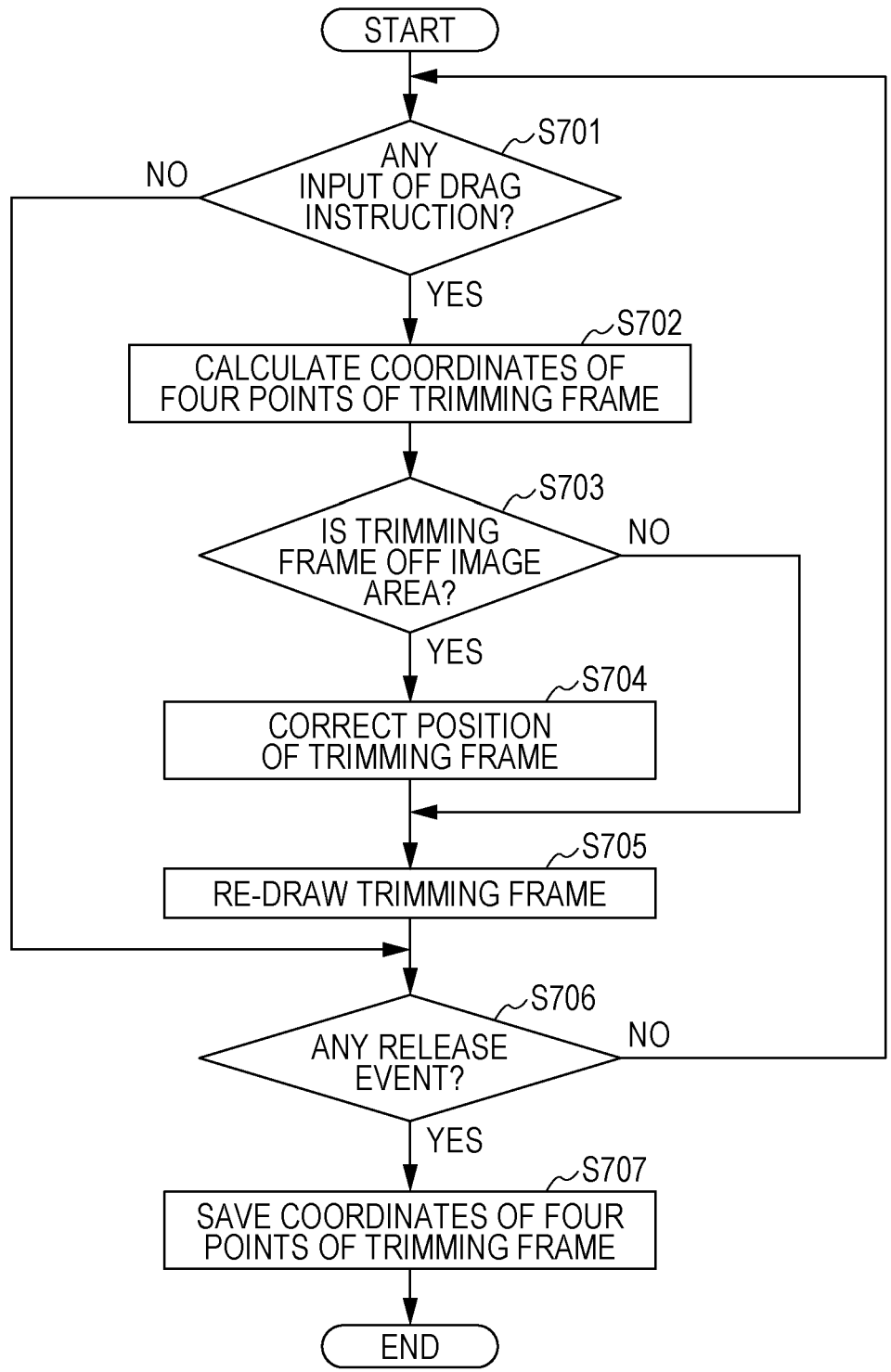
FIG. 7 is a flowchart illustrating movement processing on a trimming frame by a drag operation.

FIG. 7 is a flowchart illustrating processing of moving a trimming frame by a drag operation in S508.

First in S701, the CPU 101 determines whether a drag instruction by a user has been input from information on touch position coordinates acquired from the touch panel controller 114. If it is determined that a drag instruction has been input, the processing moves to S702. On the other hand, in a case where it is determined that a drag instruction has not been input, the processing moves to S706. The determination in S701 may be performed on the basis of a change of a touch position by a user, which is periodically detected by the touch panel controller 114. For example, in a case where the distance between a plurality of positions located by a plurality of serial detections corresponds to a predetermined distance or longer on the touch panel, it is determined that a drag operation has been performed. The plurality of touch positions also allow identification of the direction of the drag operation by a user.

In S702, the coordinates of four points of the latest trimming frame are calculated. This may be calculated by acquiring a', b', c', and d' that satisfy the equations below:

$a'-p'=a-p$ $b'-q'=b-q$ $c'-p'=c-p$ $d'-q'=d-q$ where (a, b) are upper left coordinates and (c, d) are lower right coordinates, of a trimming frame upon start of moving processing, and (p, q) are coordinates of the latest touch position when a drag instruction is input, and (p', q') are coordinates of the latest touch position, (a', b') are upper left coordinates and (c', d') are lower right coordinates, of the latest trimming frame.

Next, in S703, whether the coordinates of the four points are off the image area is determined. According to this embodiment, the image area has upper left coordinates (120, 50) and lower right coordinates (520, 350). More specifically, whether any one of the following relationships is satisfied is determined.

$$a'<120$$

$$b'<50$$

$$c'>520$$

$$d'>350$$

In a case where the trimming frame runs off the image area (YES in S703), the position of the trimming frame is corrected in S704. A trimming frame may be corrected by any one of a plurality of methods, the details of which will be described below. On the other hand, in a case where the trimming frame is within the image area (NO in S703), the trimming frame is re-drawn as it is in S705.

Whether any release event has occurred is determined in S706. If not, the processing returns to S701 again. In a case where a release event is detected (YES in S706), the coordinates of the current trimming frame are saved in S707. Then, the processing ends.

In the processing illustrated in FIGS. 6 and 7, moving control for moving a trimming frame is performed when a user touches a position within the trimming frame and then performs a drag operation.

Next, the trimming frame enlargement/reduction processing in S505 will be described with reference to FIGS. 8 and 9.

Figure 8:
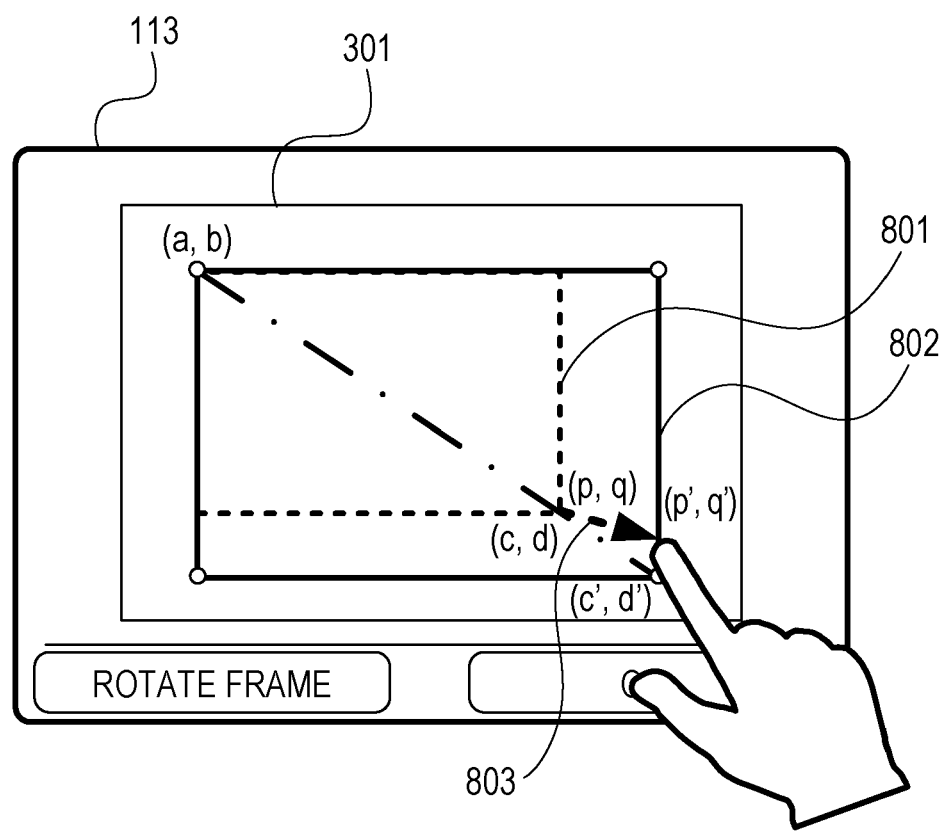
FIG. 8 is a diagram for explaining scaling processing on a trimming frame according to the embodiment.

FIG. 8 illustrates a drag operation performed directly after a touch at a lower right corner of a trimming frame 401. The broken arrow 803 represents a drag operation which moves from coordinates (p, q) to coordinates (p', q'). The broken rectangle 801 represents a trimming frame upon start of enlargement/reduction processing. The solid rectangle 802 represents a trimming frame after enlargement/reduction processing according to a drag operation in which lower right coordinates (c, d) before the processing move to coordinates (c', d').

The scaling processing on the trimming frame even keeps the aspect ratio of a trimming frame. According to this embodiment, the aspect ratio of a trimming frame is defined to be matched with the aspect ratio of a print sheet on which a trimmed image is to be printed. Thus, even scaling (enlargement/reduction) processing is performed on a trimming frame, its aspect ratio may be kept. Therefore, a user may easily define an area fitting to a print sheet as a trimming target. A print sheet may be defined by a user before a trimming mode is started or while a trimming frame is being displayed. In this case, a user may designate a desired sheet size and start a trimming mode to identify an area corresponding to the desired sheet size.

Figure 9:
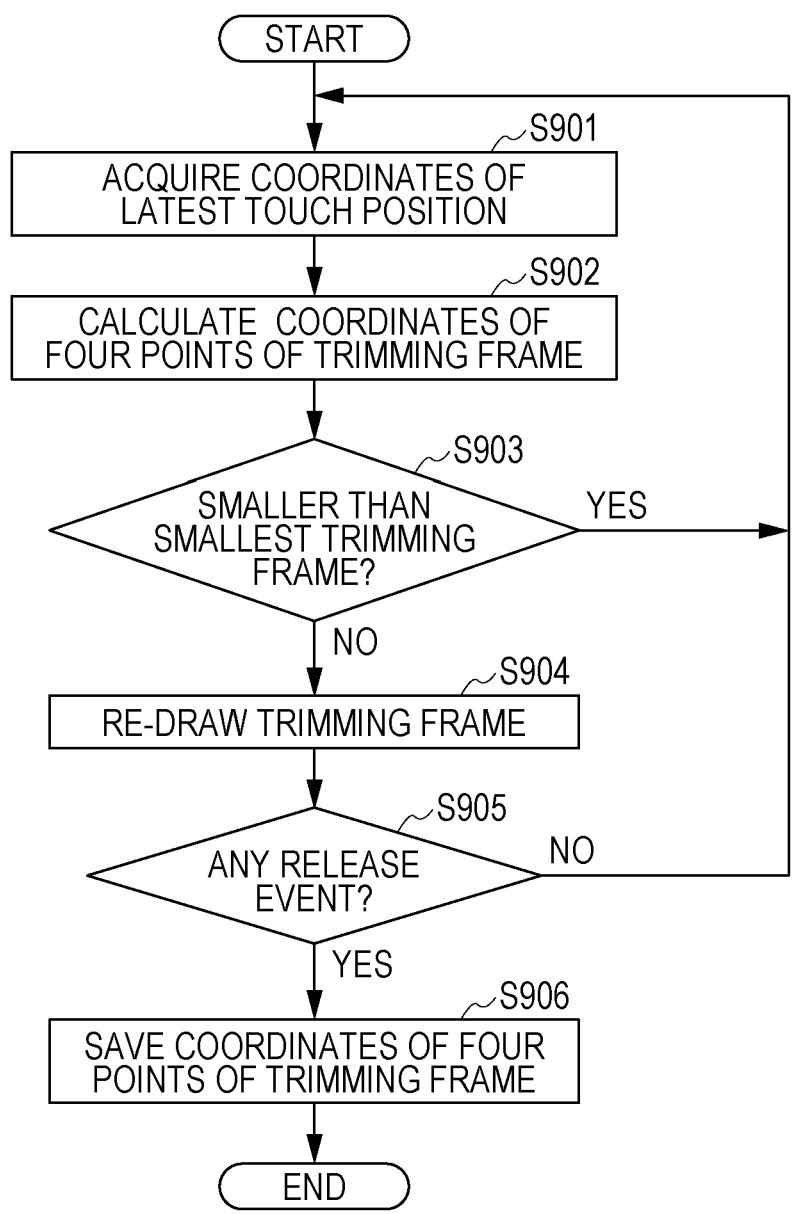
FIG. 9 is a flowchart illustrating the scaling processing on a trimming frame according to the embodiment.

FIG. 9 is a flowchart illustrating enlargement/reduction processing on a trimming frame in S505.

In S901, the CPU 101 acquires coordinates of the latest touch position from the touch panel controller 114. Next in S902, the coordinates of four points of the latest trimming frame are calculated. They may be calculated by acquiring a', b', c', and d' that satisfy the equations below. First, upper left coordinates and lower right coordinates of a trimming frame upon start of enlargement/reduction processing are defined as (a, b) and (c, d), respectively, and a touch position is defined as (p, q). Next, a', b', c', and d' that satisfy the equations below may be acquired where the latest touch position coordinates are (p', q'), an upper left coordinates and lower right coordinates of a trimming frame are (a', b') and (c', d'), respectively. Because a lower right corner is touched this time, the upper left coordinates are immovable. A trimming frame is required to have an aspect ratio matched with that of a print sheet. If (p', q') are not on the diagonal line formed by connecting (a, b) and (c, d), (p', q') is not always at the lower right corner. In other words, the calculation method for coordinates (p', q') depends on whether the coordinates (p', q') are on an upper right side or lower left side about the diagonal line. In a case where the coordinates (p', q') are on the upper right side, (p', q') are defined over the right side. In a case where the coordinates (p', q') are on the lower left side, (p', q') are defined over the lower side. Thus, the calculation equations for acquiring a', b', c', and d' are as follows.

$$a'=a$$

$$b'=b$$

$$c'=p'$$

$$(a-c)/(b-d)=(a'-c')/(b'-d')$$

where $(a-c)/(b-d) \leq (a-p')/(b-q')$.

$$a'=a$$

$$b'=b$$

$$d'=q'$$

$$(a-c)/(b-d)=(a'-c')/(b'-d')$$

where $(a-c)/(b-d) > (a-p')/(b-q')$

In the above enlargement/reduction processing in response to a drag of a lower right corner of a trimming frame, the upper left corner on the diagonal side is immovable. However, when the upper right corner is dragged, for example, a', b', c', and d' are calculated as follows such that the diagonal lower left corner may be immovable.

$$a'=a$$

$$d'=d$$

$$b'=q'$$

$$(a-c)/(b-d)=(a'-c')/(b'-d')$$

where $(a-c)/(d-b) \leq (a-p')/(d-q')$ $$a'=a$$

$$d'=d$$

$$c'=p'$$

$$(a-c)/(b-d)=(a'-c')/(b'-d')$$

where $(a-c)/(d-b) > (a-p')/(d-q')$.

Variables may be converted properly such that a lower right corner may be immovable when an upper left corner is dragged or an upper right corner may be immovable when a lower left corner is dragged. The coordinates are calculated such that the corner diagonal to the dragged corner may be immovable. Alternatively, the coordinates may be calculated such that the intersection, of the diagonal lines, that is, the barycenter of a rectangle may be immovable, for example. In a case where the dragged coordinates are outside an image area, the position may be defined as an immovable point. Then, the coordinates may be calculated such that the trimming frame may be enlarged with diagonal coordinates thereof changed. In this case, coordinates of a trimming frame may be calculated on the basis of the determination that the diagonal side of the corner designated by a user of the trimming frame is dragged in the opposite direction of the actual direction of drag while the touched coordinates are outside an image area.

According to this embodiment, it is configured to perform enlargement/reduction processing when any one of four corners is dragged. For example, enlargement/reduction processing may be performed only on one or a predetermined plurality of corners of the four corners, such as performing enlargement/reduction processing on a lower right corner only.

After coordinates of four points of a trimming frame are calculated in S902, whether the trimming frame is smaller than a smallest trimming frame is determined in S903. In a case where it is smaller than a predetermined smallest trimming frame (YES in S903), the processing returns to S901 without moving to S904 of re-drawing a trimming frame. On the other hand, in a case where it is larger than the smallest trimming frame, the trimming frame is re-drawn with the new coordinates. Whether any release event has occurred is determined in S905. If not, the processing returns to S901. In a case where it is determined in S905 that a release event has occurred (YES in S905), the coordinates of the current trimming frame are saved in DRAM 103 in S906, for example, and the processing ends.

Next, the trimming frame rotation processing in S510 will be described with reference to FIG. 10 and flowchart in FIG. 11.

Figure 10:
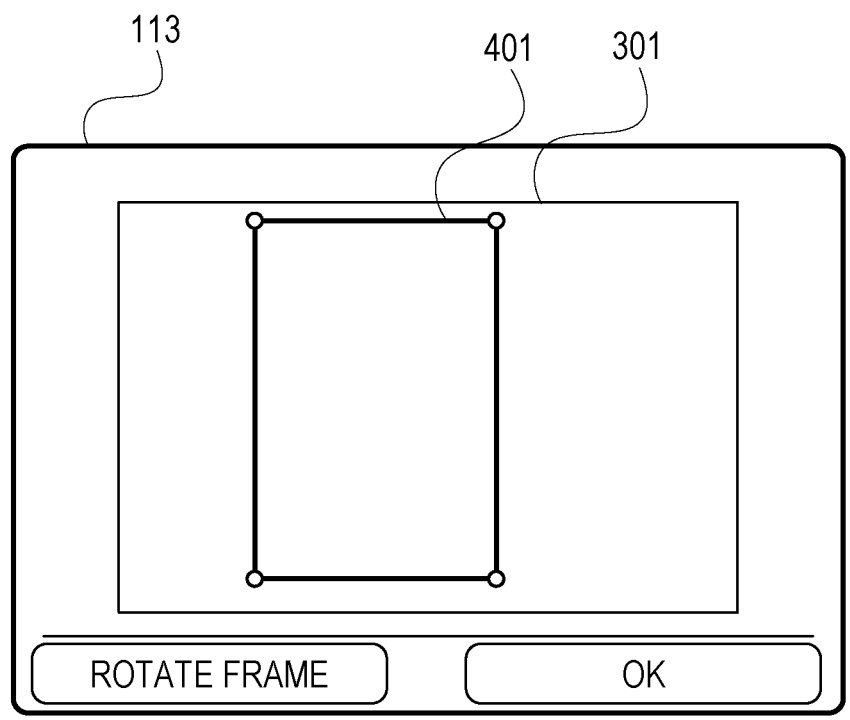
FIG. 10 is a diagram for explaining rotation processing on a trimming frame according to the embodiment.

FIG. 10 illustrates a state that the width and height of a trimming frame are interchanged after the soft key 402 is touched.

Figure 11:
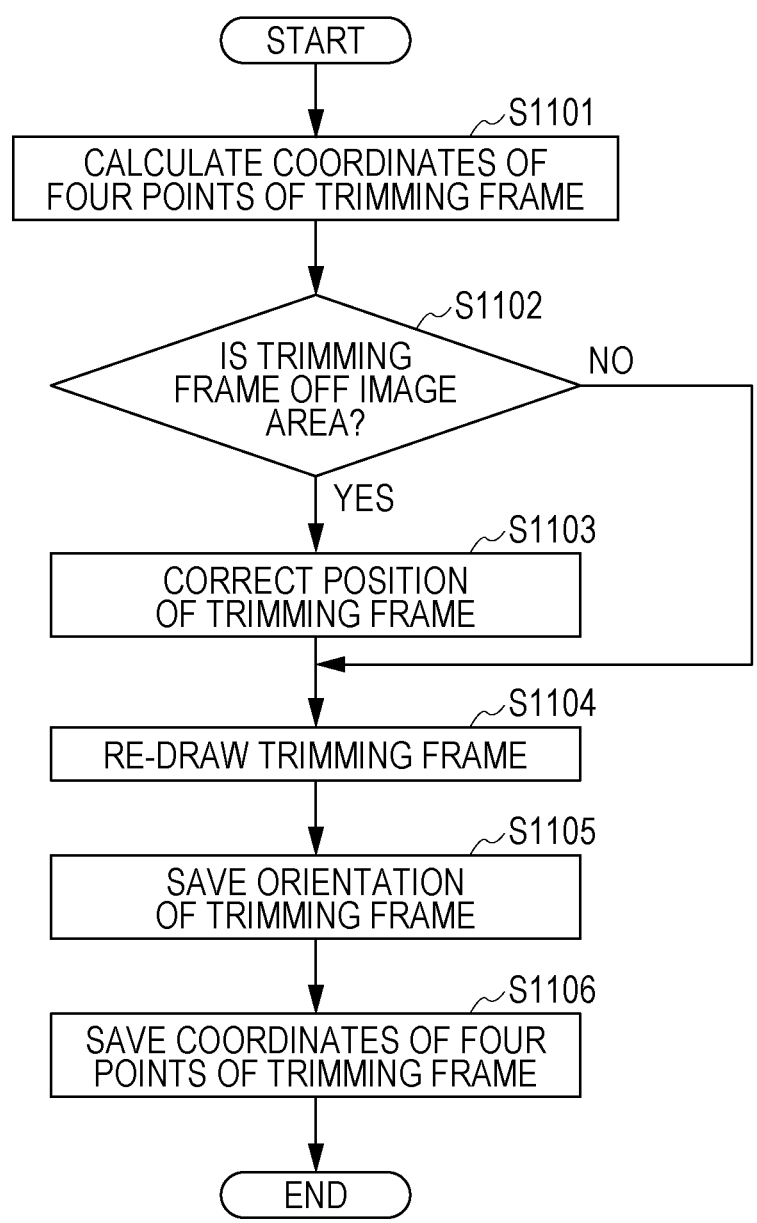
FIG. 11 is a flowchart illustrating rotation processing on a trimming frame according to this embodiment.

FIG. 11 is a flowchart illustrating processing of rotating a trimming frame in S510 in FIG. 5.

In S1101, coordinates of four points of a trimming frame after a rotation are calculated. The coordinates may be calculated by interchanging the lengths of the width and height before and after a rotation so that the coordinates of their barycenters may be matched.

Next in S1102, whether the coordinates of the four points are off an image area is determined. This is similar to the operation in S703 in FIG. 7 in the processing of moving a trimming frame. In a case where they are off the image area (YES in S1102), the position of the trimming frame is corrected in S1103. Details of steps of correcting a trimming frame will be described below.

On the other hand, in a case where the trimming frame is within the image area (NO in S1102), the trimming frame is re-drawn as it is in S1104. In S1105, the orientation of the trimming frame is saved. Further in S1106, the coordinates of the new trimming frame are saved, and the processing ends.

Next, the trimming frame movement processing in S507 will be described with reference to FIGS. 12 to 15. The processing illustrated in FIGS. 12 to 15 moves a trimming frame to the position touched by a user on the touch panel. Thus, a user may easily designate a trimming area.

Figure 12:
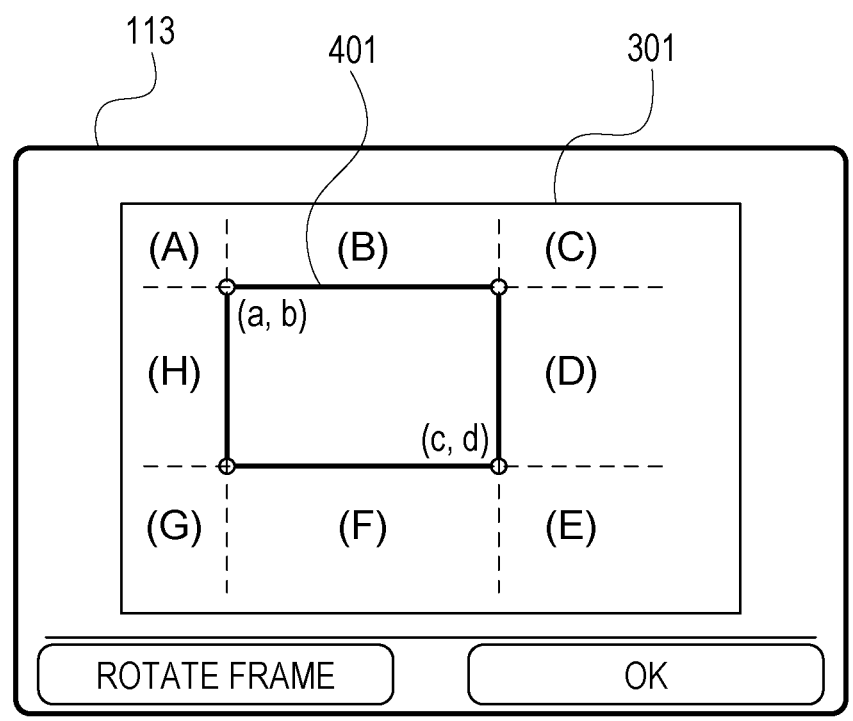
FIG. 12 illustrates external areas of a trimming frame on a touch panel.

FIG. 12 is a schematic diagram illustrating an external part to the trimming frame 401 divided into eight areas. These areas are specifically defined as:

(x, y) area satisfying (x≤a) and (y≤b): area (A)
(x, y) area satisfying (c>x>a) and (y≤b): area (B)
(x, y) area satisfying (x≥c) and (y≤b): area (C)
(x, y) area satisfying (x≥c) and (d>y<b): area (D)
(x, y) area satisfying (x≥c) and (y≥d): area (E)
(x, y) area satisfying (c>x>a) and (y≥d): area (F)
(x, y) area satisfying (x≤a) and (y≥d): area (G)
(x, y) area satisfying (x≤a) and (d>y<b): area (H)

where (a, b) are the upper left coordinates of a trimming frame and (c, d) are lower right coordinates.

Next, there will be described how the processing of moving a trimming frame is to be performed in accordance with a position touched in an area among the eight areas.

Figure 15:
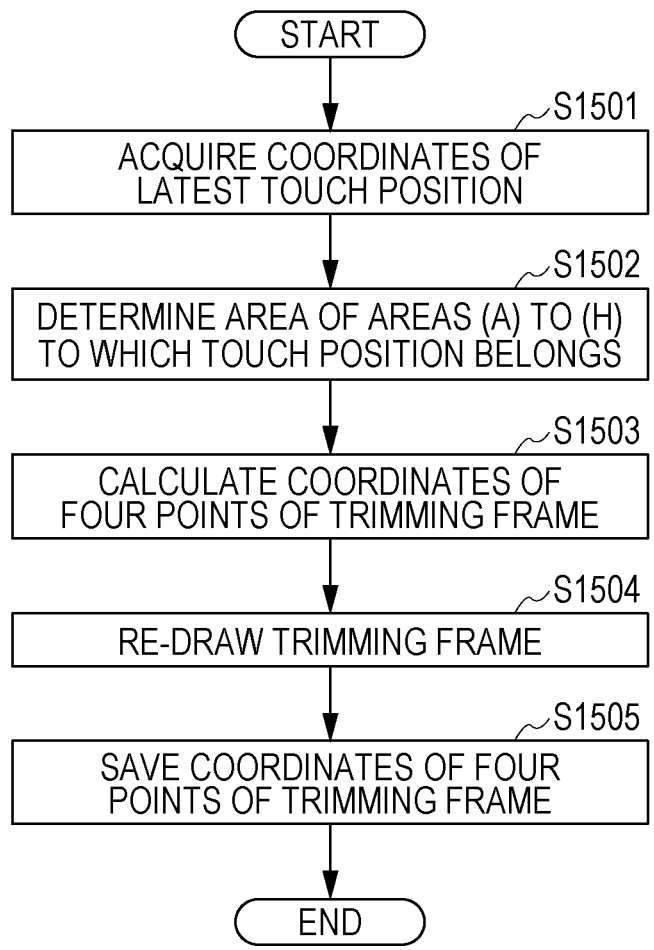
FIG. 15 is a flowchart illustrating movement processing on a trimming frame.

FIG. 15 is a flowchart illustrating processing of moving a trimming frame in S507.

First, the coordinates of a touched position (which will be called position coordinates) are acquired in S1501. It is assumed that the position coordinates acquired in S1501 are determined by the determination processing in S503 and S506 as being outside a trimming area and inside an image area. Next in S1502, which area of (A) to (H) the coordinates belong to is determined. Next in S1503, coordinates of four points of a new trimming frame are calculated. In this case, coordinates of four points of a new trimming frame are calculated so as to maintain the form and size of the trimming frame displayed on a display screen.

The new coordinates are calculated to satisfy below:
In a case where area (A) is determined: the trimming frame is moved such that its upper left corner may be matched with the touch position.
In a case where area (B) is determined: the trimming frame is vertically moved such that its top side may be matched with the touch position.
In a case where area (C) is determined: the trimming frame is moved such that its upper right corner may be matched with the touch position.
In a case where area (D) is determined: the trimming frame is horizontally moved such that its right side may be matched with the touch position.
In a case where area (E) is determined: the trimming frame is moved such that its lower right corner may be matched with the touch position.
In a case where area (F) is determined: the trimming frame is vertically moved such that its lower side may be matched with the touch position.
In a case where area (G) is determined: the trimming frame is moved such that its lower left corner may be matched with the touch position.
In a case where area (H) is determined: the trimming frame is horizontally moved such that its left side may be matched with the touch position.

After that, in S1504, the new trimming frame is re-drawn. In S1505, the coordinates of the new trimming frame may be saved in the DRAM 103, for example, and the processing ends.

FIGS. 13A and 13B and 14A and 14B illustrate specific examples.

Figure 13A:
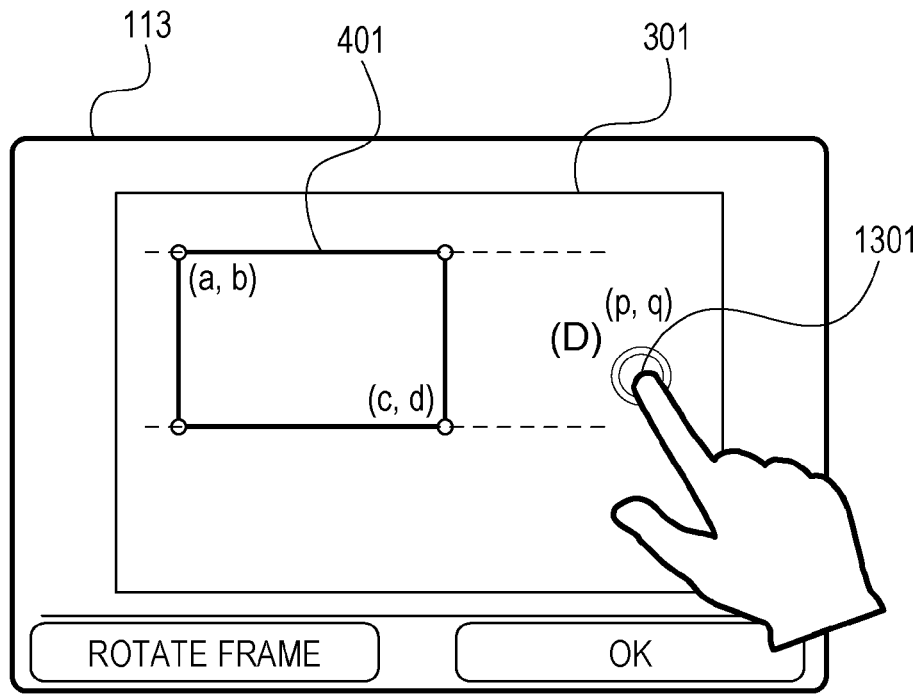
FIGS. 13A and 13B illustrate an example of movements of a trimming frame.
Figure 13B:
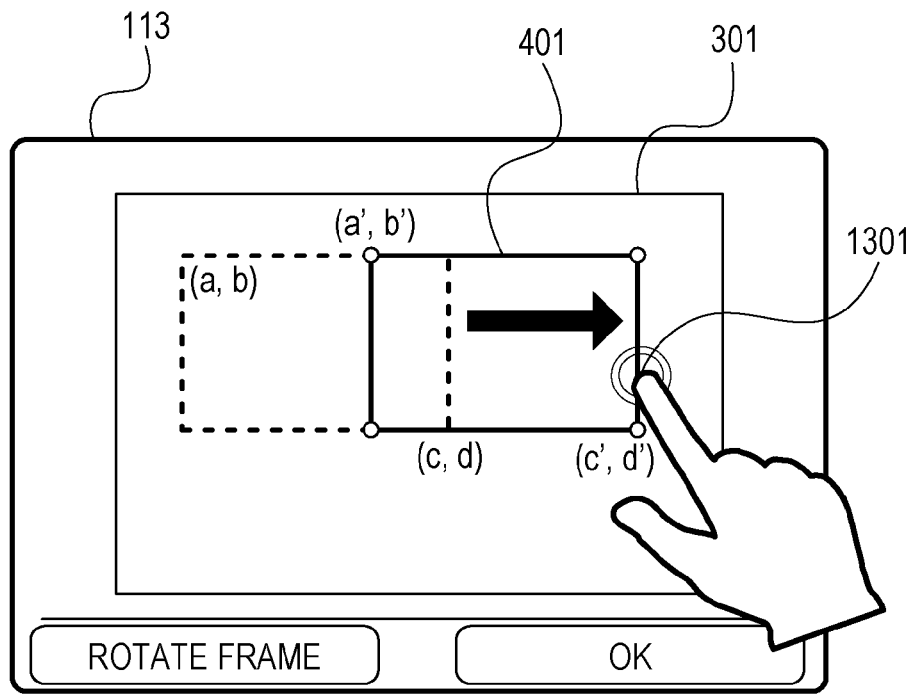

FIG. 13A illustrates that a touch position 1301 belongs to area (D). In this case, as illustrated in FIG. 13B, the trimming frame 401 is horizontally moved to the touch position 1301. This may be implemented by acquiring a', b', c', and d' that satisfy the equations below and re-drawing a trimming frame.

$$a'=a+(p-c)$$

$$b'=b$$

$$c'=p$$

$$d'=d$$

where upper left coordinates of the trimming frame before the movement are (a, b), lower right coordinates thereof are (c, d), and the coordinates of the touch position 1301 are (p, q), and the upper left coordinates of the trimming frame after the movement are (a', b'), and the lower right coordinates thereof are (c', d').

Having described a specific example when the right side of the trimming frame is horizontally moved, the coordinates after a movement may be acquired by interchanging variables also when the left side is moved. Therefore, the description thereof will be omitted. Also, the coordinates may be calculated by interchanging XY coordinates when a trimming frame is vertically moved.

Figure 14A:
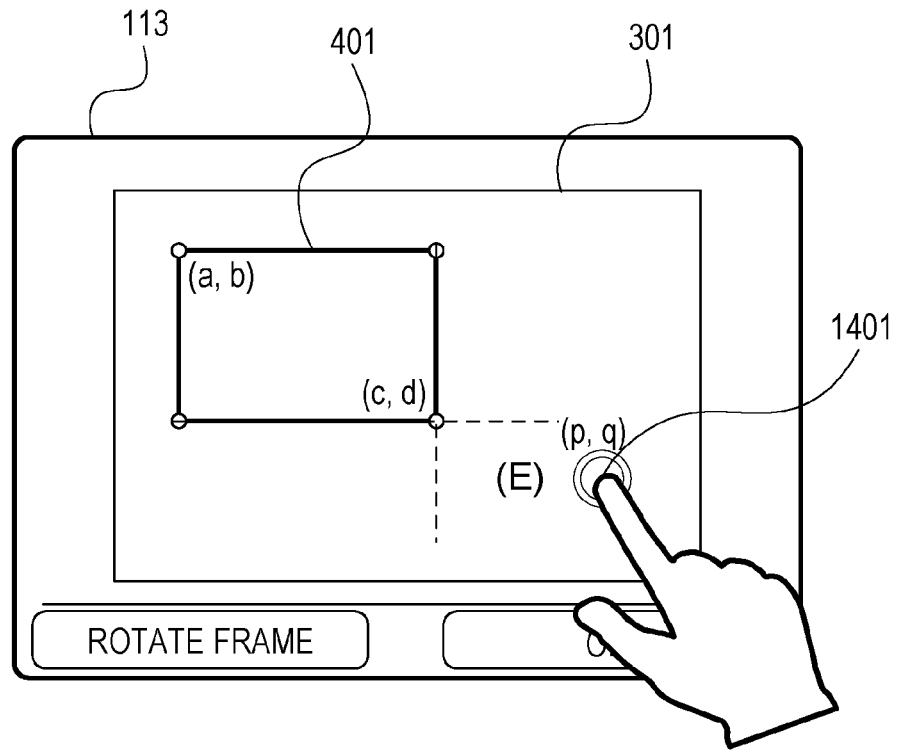
FIGS. 14A and 14B illustrate an example of movements of a trimming frame.
Figure 14B:
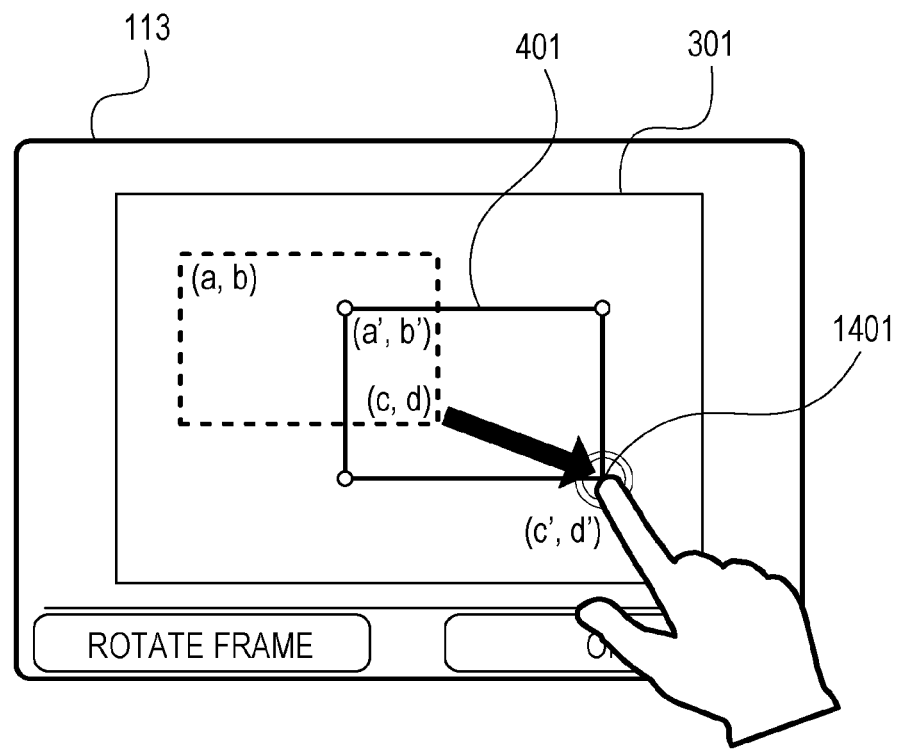

FIG. 14A illustrates that a touch position 1401 belongs to area (E). In this case, as illustrated in FIG. 14B, the lower right corner of the trimming frame 401 moves to the touch position 1401. Similarly to the case above, a', b', c', and d' that satisfy the equations below are acquired by:

$$a'=a+(p-c)$$

$$b'=b+(q-d)$$

$$c'=p$$

$$d'=q$$

where the coordinates before a movement are (a, b), (c, d), and (p, q). Then, the upper left coordinates (a', b') and lower right coordinates (c', d') of the trimming frame after the movement are decided.

Having described the specific example when a lower right corner of a trimming frame is moved, the coordinates after a movement may be acquired by interchanging variables properly when another corner is moved. Therefore, the description thereof will be omitted.

As described above, the movement processing illustrated FIGS. 12 to 15 moves a trimming frame to the position designated by a user that is outside a trimming area. Thus, a trimming frame may be moved to a desired position without a drag operation by a user. The movement processing places a trimming frame in an inner part from the position touched by a user in an image area on a touch panel. The movement processing allows a user to touch an internal part of an image area. Thus, a trimming frame does not run off the image area. Therefore, a user may easily designate a desired trimming area.

The trimming frame displayed on a display screen is moved with its form and size maintained. For example, when a user causes a trimming frame having a desired size and aspect ratio to be displayed and then designates a part outside the trimming frame, the trimming frame may be quickly moved to a desired position with its desired size and aspect ratio maintained.

Figure 16A:
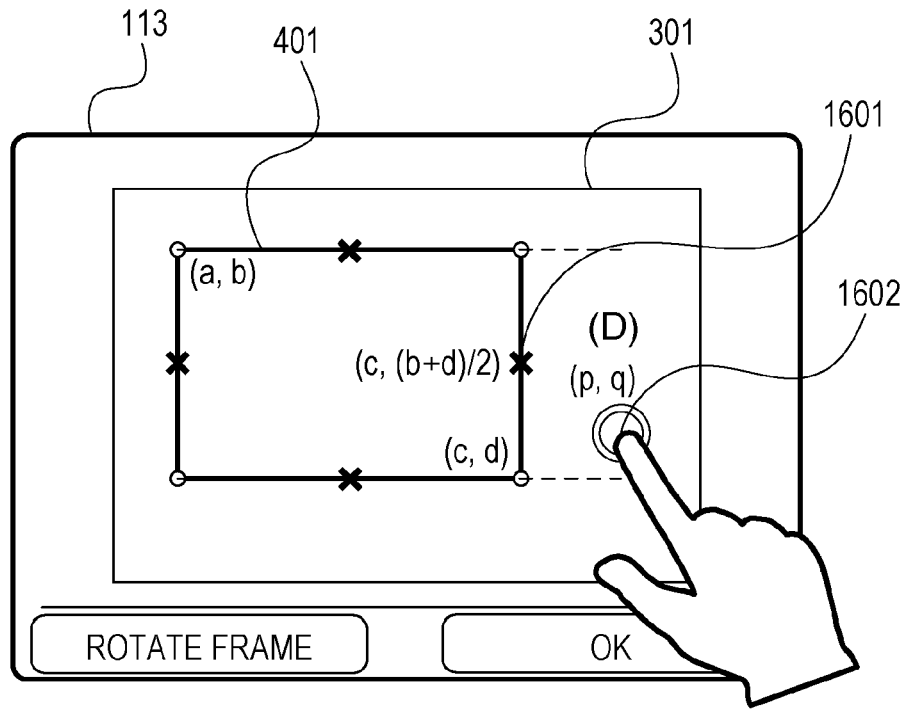
FIGS. 16A and 16B illustrate an example of movements of a trimming frame.
Figure 16B:
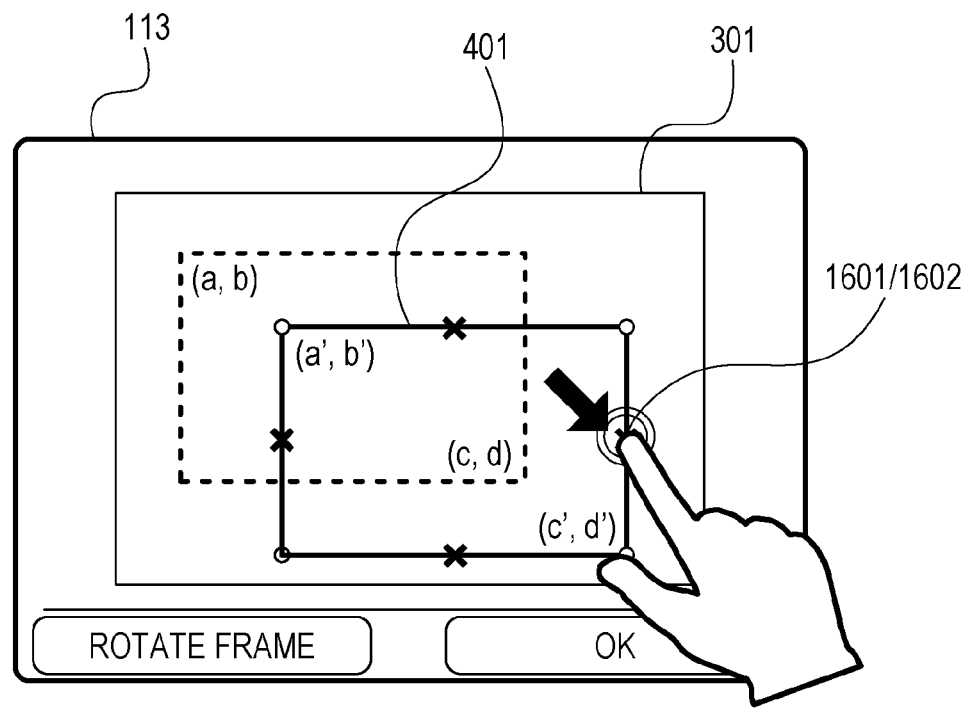
Figure 17:
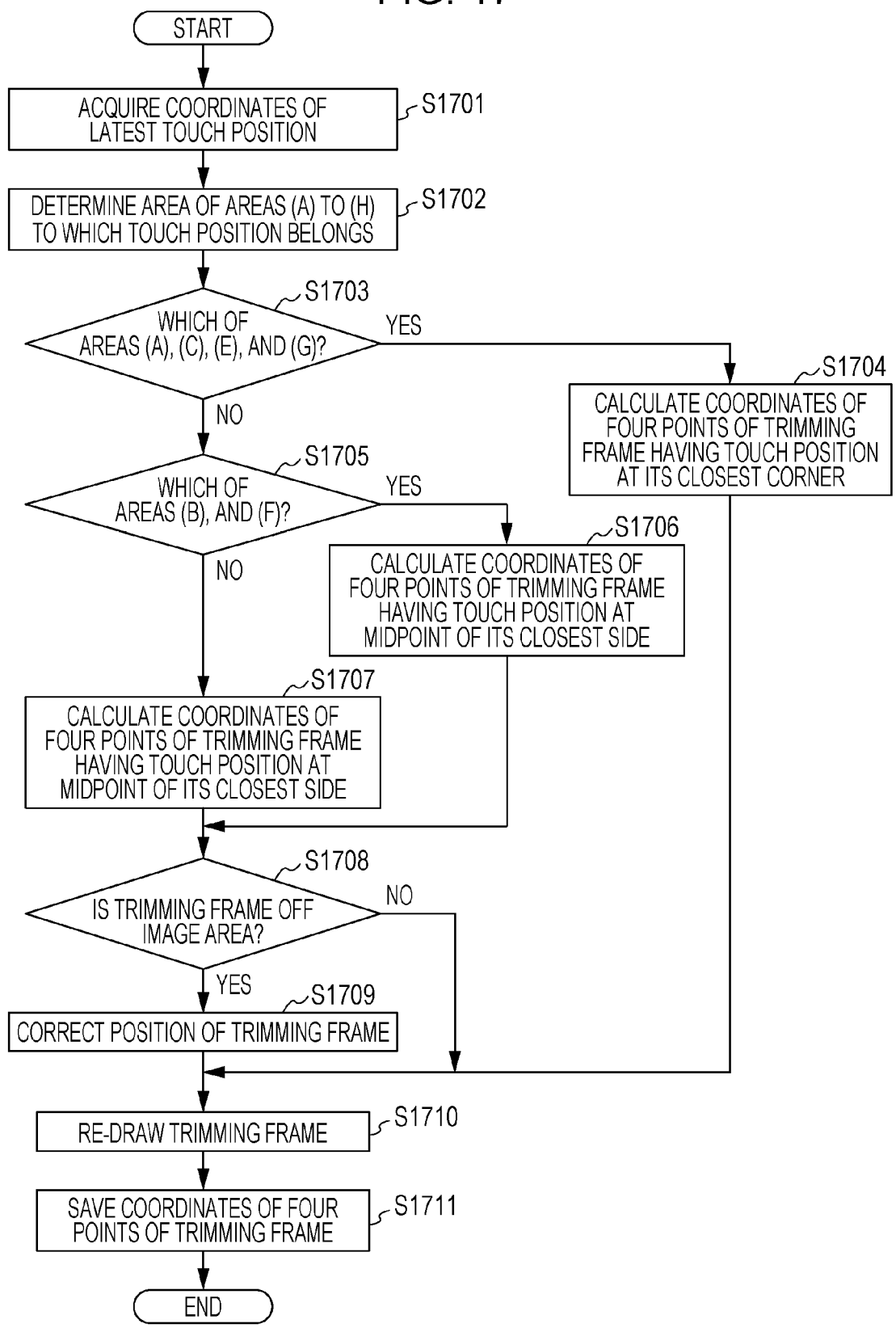
FIG. 17 is a flowchart illustrating movement processing on a trimming frame.

Next, another example of the movement processing on a trimming frame in S507 will be described with reference to FIGS. 16A and 16B and 17. FIG. 17 is a flowchart illustrating the second trimming-frame movement processing in S507. In a case where a user touches one of (B), (H), (F), and (D), the movement processing illustrated in FIG. 17 moves a trimming frame such that a midpoint on the side closest to a touch position in the trimming frame may be matched with the touch position. For example, in a case where area (D) is touched as illustrated in FIG. 16A, the trimming frame is moved such that a midpoint of a right side of the trimming frame is matched with the touch position.

First in S1701, the coordinates of the touched position are acquired. Next in S1702, which of areas (A) to (H) illustrated in FIG. 12 to which the coordinates belong is determined. Next in S1703, whether the area determined in S1702 is one of (A), (C), (E), and (G) is determined. In a case where it is one of the four areas (YES in S1703), the coordinates of four points of a new trimming frame are calculated such that the closest corner may be matched with the touch position in S1704 in the same manner as that of the processing illustrated in FIG. 15.

On the other hand, in a case where the area determined in S1702 is not one of the four areas (NO in S1703), whether the touch position belongs to one of (B) and (F) is determined in S1705 next. In S1706, the coordinates of four points of the trimming frame may be calculated such that a midpoint of a top side may be matched with the touch position in a case where it belongs to (B) or such that a midpoint of a lower side may be matched with the touch position in a case where it belongs to (F). In a case where the touch position belongs to none of (B) and (F) (NO in S1705), it is determined that one of (D) and (H) has been touched. In this case, the coordinates of four points of the trimming frame are calculated such that a midpoint of the right side may be matched with the touch position in a case where the touch position belongs to (D) in S1707 or such that a midpoint of a left side may be matched with the touch position in a case where the touch position belongs to (H).

Next in S1708, whether the coordinates of the four points are off the image area is determined. This may be determined in the same manner as the trimming-frame movement processing. In a case where the coordinates are off the image area (YES in S1708), the position of the trimming frame is corrected in S1709. The details of steps of correcting a trimming frame will be described below.

On the other hand, in a case where the trimming frame is within the image area (NO in S1708), the trimming frame is re-drawn as it is in S1710. In S1711, the coordinates of a new trimming frame may be saved in the DRAM 103, for example, and the processing ends.

FIG. 16A illustrates that a touch position 1602 is located outside a trimming frame 401 and belongs to area (D). In this case, as illustrated in FIG. 16B, a midpoint 1601 of a right side of the trimming frame 401 moves to a touch position 1602. Similarly to the case above, a', b', c', and d' that satisfy the equations below are acquired:

$$a'=a+(p-c)$$

$$b'=b+q-(b+d)/2$$

$$c'=p$$

$$d'=d+q-(b+d)/2$$

where the coordinates before a movement are (a, b), (c, d), and (p, q). Then, the upper left coordinates (a', b') and lower right coordinates (c', d') of the trimming frame after the movement are decided.

Having described the specific example when a midpoint of a right side of a trimming frame is moved, the coordinates after a movement may be acquired by interchanging variables properly when a midpoint of another side of the trimming frame is moved. Therefore, the description thereof will be omitted. According to this embodiment, it is configured that the closest corner moves in a case where one of areas (A), (C), (E) and (G) of the eight divided areas is determined. Without limiting thereto, in a case where (A) or (C) is determined, a midpoint of the top side may be moved in the same manner as the case where area (B) is determined. In a case where area (E) or (G) is determined, a midpoint of a lower side may be moved in the same manner as the case where area (F) is determined.

Alternatively, in a case where area (A) or (G) is determined, a midpoint of the left side may be moved in the same manner as the case where (H) is determined. In a case where area (C) or (E) is determined, a midpoint of a right side may be moved in the same manner as the case where (D) is determined.

Figure 18A:
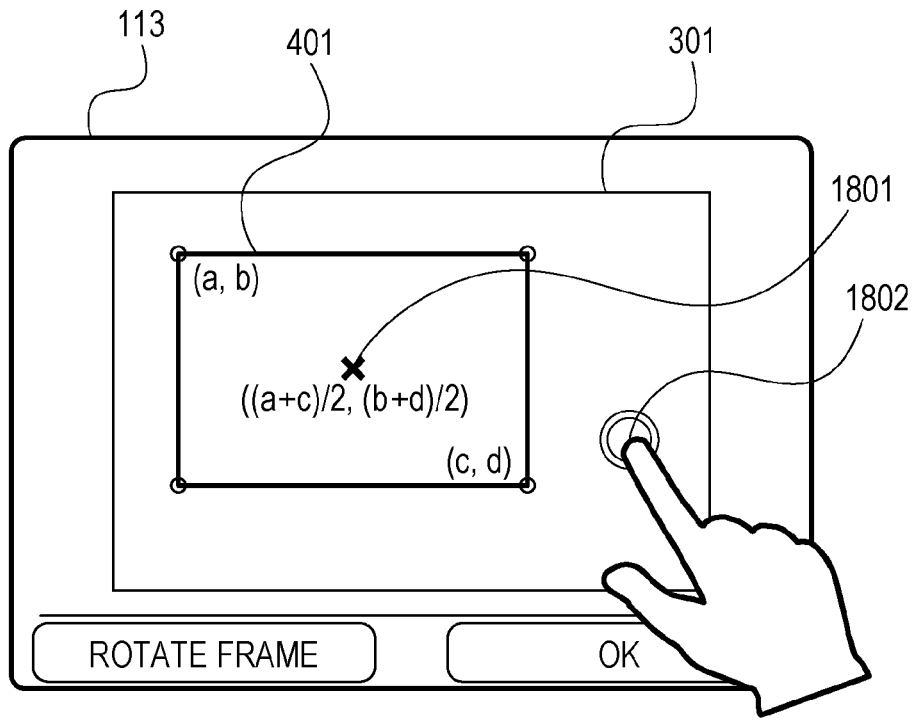
FIGS. 18A and 18B illustrate an example of movements of a trimming frame.
Figure 18B:
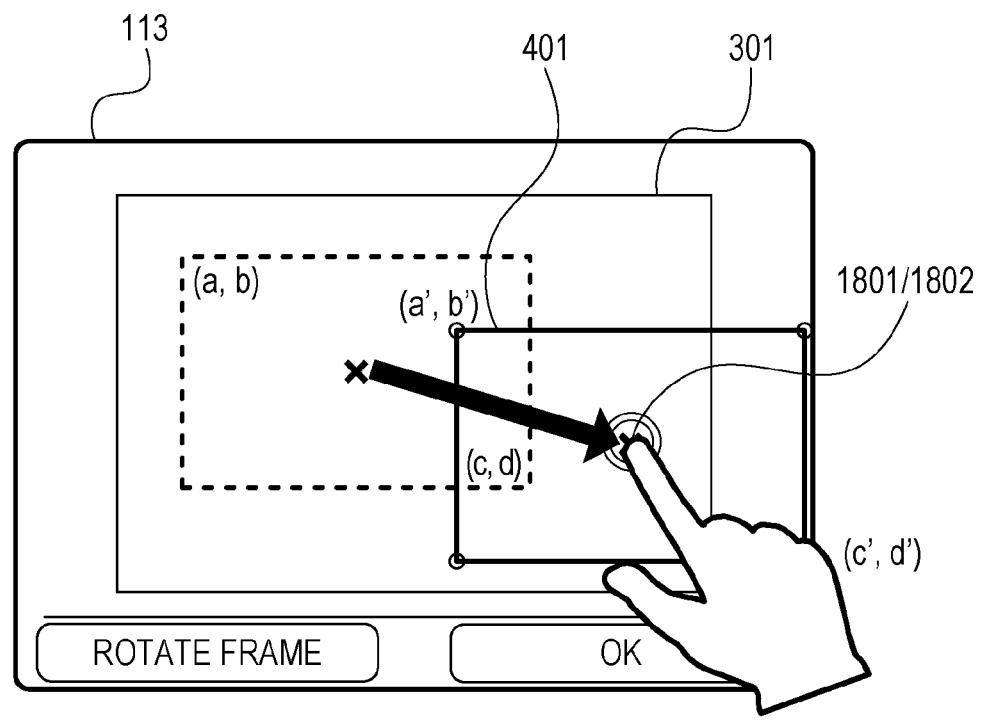
Figure 19:
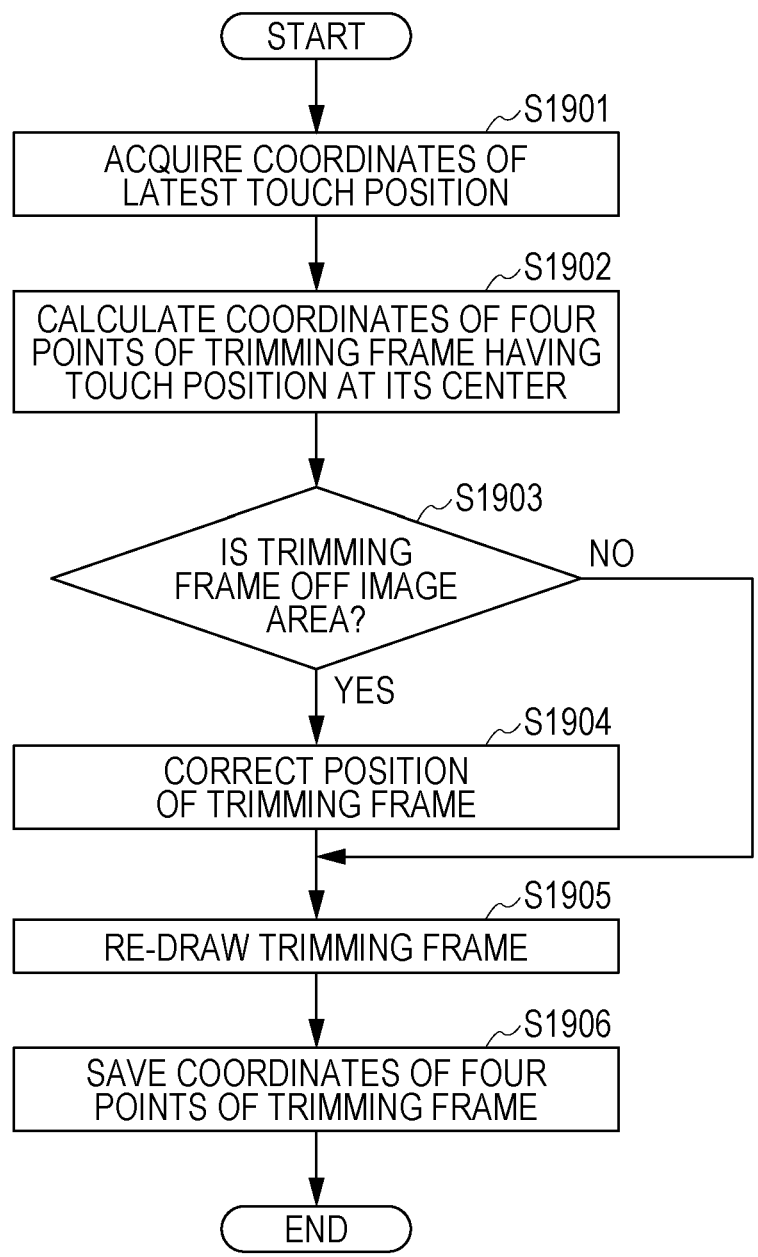
FIG. 19 is a flowchart illustrating movement processing on a trimming frame.

Next, another example of the trimming-frame movement processing in S507 will be described with reference to FIGS. 18A and 18B and FIG. 19. FIG. 19 is a flowchart illustrating the third trimming frame movement processing in S507. The movement processing illustrated in FIG. 19 moves a trimming frame such that the barycenter point of a trimming frame may be matched with a touch position by a user. For example, as illustrated in FIGS. 18A and 18B, a trimming frame is moved to a position touched by a user. However, in this case, the trimming frame runs off the image area, as illustrated in FIG. 18B. In this case, the position of the trimming frame is corrected, the details of which will be described below.

FIG. 19 is a flowchart illustrating the third trimming frame movement processing in S507. The coordinates of the touched position are acquired in S1901. Next in S1902, coordinates of four points are calculated such that the coordinates may be the barycenter of a new trimming frame. Similarly to the case above, a', b', c', and d' that satisfy the equations below are acquired by:

$(c'+a')/2=p$ $(d'+b')/2=q$ $a'-c'=a-c$ $b'-d'=b-d$ where the coordinates before a movement are (a, b), (c, d), and (p, q). Then, the upper left coordinates (a', b') and lower right coordinates (c', d') of the trimming frame after the movement are decided.

Next in S1903, whether the coordinates of the four points are off an image area is determined. This may be determined in the same manner as S703 in FIG. 7. In a case where the coordinates are off the image area (YES in S1903), the position of the trimming frame is corrected in S1904. Details of steps of correcting a trimming frame will be described below.

On the other hand, in a case where the trimming frame is within the image area (NO in S1903), the trimming frame is re-drawn as it is in S1905. In S1906, the coordinates of the new trimming frame are saved in the DRAM 103, and the processing ends.

FIGS. 18A and 18B illustrate a specific example. FIG. 18A illustrates that a touch position 1802 is located outside a trimming frame. In this case, the barycenter 1801 of the trimming frame 401 moves to a touch position 1802 as illustrated in FIG. 18B. FIG. 18B illustrates a state that a trimming frame after a movement runs off an image area 301. In this case, the position of the trimming frame is corrected before the trimming frame is re-drawn as it is.

Next, the trimming-frame position correction processing will be described with reference to FIGS. 20A and 20B. The correction processing illustrated in FIGS. 20A and 20B is executed in S704 in FIG. 7, S1103 in FIG. 11, S1709 in FIG. 17, and S1904 in FIG. 19.

Figure 20A:
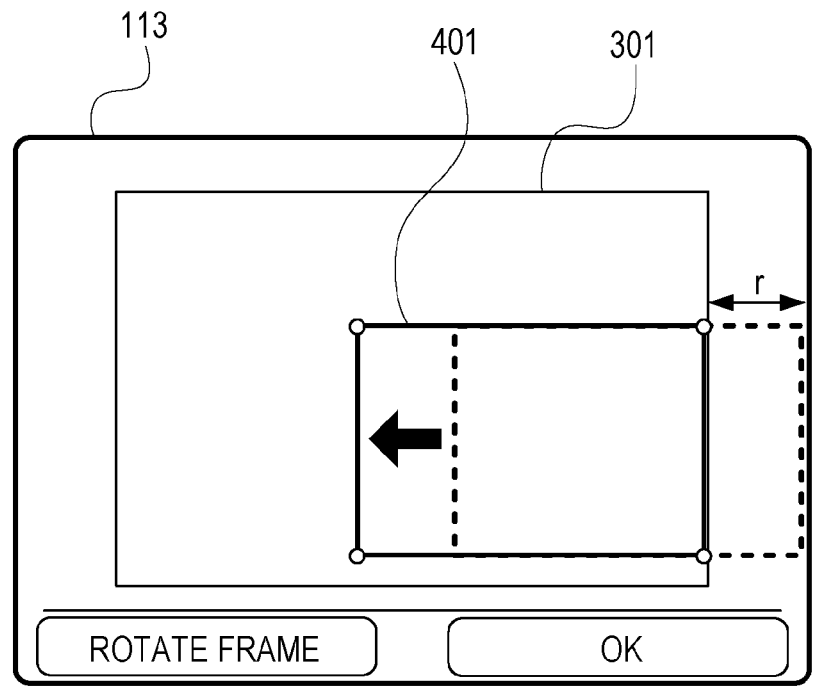
FIGS. 20A and 20B illustrate position correction processing on a trimming frame that runs off an image area.
Figure 20B:
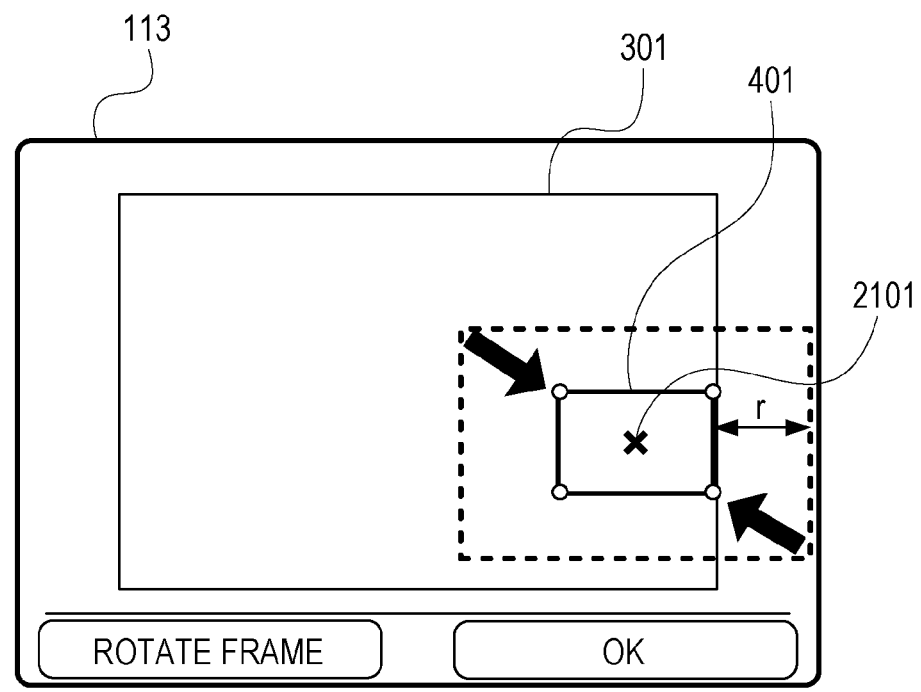

FIG. 20A illustrates an example of a state that a trimming frame 401 indicated by a broken line runs off the image area 301 to the right side in an X coordinate direction. In this case, the trimming frame is moved horizontally to the left side in the X coordinate direction with its size maintained as indicated by the illustrated solid line for correction to fit into an image area. The correction value may be calculated by subtracting r from values of X coordinates of four corners of a trimming frame where r is a length that runs off an image area. When a trimming frame runs off an image area to the left side in the X coordinate direction by r, the correction value may be calculated by adding r to the value of the X coordinates of four corners. When a trimming frame runs off an image area toward the top/bottom in the Y coordinate direction, the correction may be performed in the same manner. When a trimming frame runs off in both of the X and Y directions, the correction in the same manner is performed on the X coordinates and Y coordinates.

Next, another example of the trimming-frame correction processing will be described with reference to FIG. 20B. FIG. 20B illustrates an example of a state that a trimming frame 401 indicated by the illustrated broken line runs off from an image area 301 to the right side in an X coordinate direction. In this case, reduction processing is performed on both of X and Y coordinates by keeping the center of gravity 2101 of the trimming frame as indicated by the illustrated solid line to fit the trimming frame into an image area.

The correction values for the X coordinates may be calculated by adding r to the X coordinates of the left two points and subtracting r from the X coordinates of the right two points where r is a length that runs off an image area in an X coordinate direction. The value or values to be added or subtracted may be calculated from the aspect ratio and r of a trimming frame in a Y coordinate in the same manner. When a trimming frame runs off to the top/bottom in the Y coordinate direction, it may be corrected in the same manner.

In a case where a trimming frame runs off an image area both in X and Y directions compositely, a correction value for the X coordinates is acquired to correct. In a case where the trimming frame still runs off at Y coordinates even after the correction for the X coordinates, the Y coordinates are then corrected.

The two correction methods described with reference to FIGS. 20A and 20B may be used properly. For example, a trimming frame may run off in the upper and lower directions of the trimming frame as a result of the trimming-frame rotation processing. In this case, the correction method illustrated in FIG. 20B may be performed to correct the trimming frame accurately.

According to the aforementioned embodiment, when a user touches an area on an image displayed on a display screen and outside an object such as a trimming frame, the trimming frame moves to the position. Thus, a user may quickly move a trimming frame to a desired position without performing a drag operation. Thus, an area to be trimmed may be decided easily.

When a user designates an internal part of the trimming frame, the trimming frame moves by following a drag operation. Thus, a user may touch and perform a drag operation within a trimming frame for adjustment in detail of the position of a trimming frame.

A user may touch outside a trimming frame and quickly move the trimming frame so that the trimming frame may be moved by the drag operation. Thus, a user may designate an external part to a trimming frame and decide a position roughly, for example. Then, the user may continuously perform a drag operation to adjust the position of the trimming frame.

According to this embodiment, when a user designates a position outside a trimming frame displayed on a display screen, the trimming frame moves in accordance with the designated position with its form and size maintained. Thus, for example, a user may display a trimming frame having a desired size and aspect ratio and then designate an external part to the trimming frame so that the trimming frame may quickly be moved to a desired position with its desired size and aspect ratio maintained.

An example that a trimming frame already displayed on a display screen is moved has been described according to the embodiment. However, an embodiment is not limited thereto. For example, a user may display a trimming frame and perform a scroll operation thereon. Then, on a screen where the trimming frame is no longer displayed, the trimming frame may be moved to a position touched by a user. In this case, a user may quickly move the trimming frame to a desired position without designating the trimming frame displayed before the scroll operation. Furthermore, when a trimming frame is not displayed yet, a trimming frame is newly displayed at a touch position in accordance with a touch by a user.

According to the embodiment above, it is configured such that the aspect ratio of a trimming frame may be matched with the aspect ratio of a print sheet. However, an embodiment is not limited thereto. For example, when a side or corner of a trimming frame is dragged, a trimming frame having an arbitrary aspect ratio may be defined.

Furthermore, according to the aforementioned embodiment, processing of displaying a trimming frame for trimming has been described as an example of processing to be executed on an image. However, an example is not limited thereto. When processing such as color correction and brightness correction is performed on an image, an area to be processed on the image may be decided.

According to the aforementioned embodiment, an example has been described that a user uses a touch panel for instruction to decide an area to be processed on an image. However, an embodiment is not limited thereto. The present invention is applicable to a case where a pointing device such as a mouse, a trackball, a touch pen, and a touch pad is used to decide an area to be processed.

Furthermore, an image to be processed is not limited to a photograph image. It may be any image such as a text document, a vector image and a Web page based on a structured document.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, the present invention is not limited to a case where one computer (or a CPU or an MPU, etc.) executes processing. The processing described according to the above-described embodiment may be implemented even when a plurality of computers (or CPUs or MPUs, etc.) cooperate to implement the processing. The present invention is not limited to a case that a computer (or a CPU or an MPU, etc.) executed a program stored in a memory such as a ROM. Hardware (such as a circuit) for performing the processing according to the above-described embodiment may perform the processing. Furthermore, a part of the processing according to the above-described embodiment may be performed by a computer (or a CPU or an MPU, etc.), and the remaining part may be performed by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203096 filed Sep. 14, 2012, which is hereby incorporated by reference herein in its entirety.

What is claimed is:

1. An apparatus comprising:
a memory configured to store a program; and
a processor configured to execute the program stored in the memory,
wherein the processor causes a display screen to display an image and a rectangular object indicating a rectangular area in the image,
wherein, in a case where a position designated by a user in the image is a first position which is outside the displayed rectangular object and satisfies a predetermined condition, the processor causes the rectangular object to move in the display screen so that a point on a side of the rectangular object nearest to the first position and different from two ends of the side moves to the first position, the predetermined condition being a condition that a horizontal or vertical coordinate of the first position in the image is greater than a minimum horizontal or vertical coordinate of the rectangular object and is smaller than a maximum horizontal or vertical coordinate of the rectangular object respectively, and
wherein, in a case where the position designated by the user in the image is a second position which is outside the displayed rectangular object and does not satisfy the predetermined condition, the processor causes the rectangular object to move, in the display screen, so that a corner of the displayed rectangular object nearest to the second position moves to the second position.

2. The apparatus according to claim 1, wherein in a case where the position designated by the user is included in the rectangular object, the rectangular object is moved in accordance with a drag instruction from the position by the user.

3. The apparatus according to claim 1, wherein the display screen is a touch panel, and the position is designated by a touch to the position by the user on the touch panel, and
wherein in a case where the processor causes the rectangular object to move in the display screen in accordance with a touch to the first or the second position, and then a drag instruction by a user is performed without release by the user from the touch panel, the rectangular object which has been moved is further moved in accordance with the drag instruction.

4. The apparatus according to claim 1, wherein the predetermined condition includes a first condition that a vertical coordinate of the first position in the image is greater than a minimum vertical coordinate of the rectangular object and is smaller than a maximum vertical coordinate of the rectangular object, and that a horizontal coordinate of the first position in the image is smaller than a minimum horizontal coordinate of the rectangular object or is greater than a maximum horizontal coordinate of the rectangular object, wherein the predetermined condition includes a second condition that a horizontal coordinate of the first position in the image is greater than the minimum horizontal coordinate of the rectangular object and is smaller than the maximum horizontal coordinate of the rectangular object, and that a vertical coordinate of the first position in the image is smaller than the minimum vertical coordinate of the rectangular object or is greater than the maximum vertical coordinate of the rectangular object, wherein, in a case where the first position satisfies the first condition, the processor causes the rectangular object to move in the display screen, so that a vertical side of the displayed rectangular object nearer to the first position moves horizontally to the first position, and that the rectangular object does not move vertically, and wherein, in a case where the first position satisfies the second condition, the processor causes the rectangular object to move in the display screen, so that a horizontal side of the displayed rectangular object nearer to the first position moves vertically to the first position, and that the rectangular object does not move horizontally.

5. The apparatus according to claim 1, the rectangular object indicates the rectangular area to which a predetermined process is to be executed.

6. The apparatus according to claim 5, wherein the rectangular area is an area to be trimmed.

7. The apparatus according to claim 1, wherein the processor causes the rectangular object to move such that the rectangular object does not run off the image on the display screen.

8. The apparatus according to claim 1, wherein in a case where the first position or the second position is designated by the user, the processor causes the display screen to newly display a rectangular object after the moving and not to display the rectangular object before the moving, and the rectangular object is thus moved.

9. The apparatus according to claim 1, wherein the display screen is a touch panel.

10. A method comprising:
causing a display screen to display an image and a rectangular object indicating a rectangular area in the image;
in a case where a position designated by a user is a first position which is outside the displayed rectangular object in the image and satisfies a predetermined condition, causing the rectangular object to move in the display screen so that a point which is on a side of the rectangular object nearest to the first position and different from two ends of the side moves to the first position, the predetermined condition being a condition that a horizontal or vertical coordinate of the first position in the image is greater than a minimum horizontal or vertical coordinate of the rectangular object and is smaller than a maximum horizontal or vertical coordinate of the rectangular object respectively; and in a case where the position designated by the user is a second position which is outside the displayed rectangular object in the image and does not satisfy the predetermined condition, causing the rectangular object to move in the display screen, so that a corner of the displayed rectangular object nearest to the second position moves to the second position.

11. The method according to claim 10, wherein in a case where the position designated by a user is included in the rectangular object, the rectangular object is moved in accordance with a drag instruction from the position by the user.

12. The method according to claim 10, wherein the display screen is a touch panel, and the position is designated by a touch to the position by the user in the touch panel, and wherein in a case where the rectangular object is moved in the display screen in accordance with a touch to the first or the second position, and then a drag instruction by a user is performed without release by the user from the touch panel, the rectangular object which has been moved is further moved in accordance with the drag instruction.

13. The method according to claim 10, wherein the predetermined condition includes a first condition that a vertical coordinate of the first position in the image is greater than a minimum vertical coordinate of the rectangular object and is smaller than a maximum vertical coordinate of the rectangular object, and that a horizontal coordinate of the first position in the image is smaller than a minimum horizontal coordinate of the rectangular object or is greater than a maximum horizontal coordinate of the rectangular object, wherein the predetermined condition includes a second condition that a horizontal coordinate of the first position in the image is greater than the minimum horizontal coordinate of the rectangular object and is smaller than the maximum horizontal coordinate of the rectangular object, and that a vertical coordinate of the first position in the image is smaller than the minimum vertical coordinate of the rectangular object or is greater than the maximum vertical coordinate of the rectangular object, wherein, in a case where the first position satisfies the first condition, the rectangular object moves in the display screen, so that a vertical side of the displayed rectangular object nearer to the first position moves horizontally to the first position, and that the rectangular object does not move vertically, and wherein, in a case where the first position satisfies the second condition, the rectangular object moves in the display screen, so that a horizontal side of the displayed rectangular object nearer to the first position moves vertically to the first position, and that the rectangular object does not move horizontally.

14. The method according to claim 10, wherein the rectangular object indicates the rectangular area to which a predetermined process is to be executed.

15. The method according to claim 14, wherein the rectangular area is an area to be trimmed.

16. The method according to claim 10, wherein the rectangular object is moved such that the rectangular object does not run off the image on the display screen.

17. The method according to claim 10, wherein in a case where the first position or the second position is designated by the user, a rectangular object after the moving is newly displayed and the rectangular object before the moving is not displayed, and the rectangular object is thus moved.

18. The method according to claim 10, wherein the display screen is a touch panel.

* * * * *